(12) United States Patent
Kawate et al.

(10) Patent No.: US 7,624,136 B2
(45) Date of Patent: Nov. 24, 2009

(54) FILE RECORDING DEVICE, FILE REPRODUCING DEVICE, FILE EDITING DEVICE, FILE RECORDING METHOD, FILE REPRODUCING METHOD, FILE EDITING METHOD, PROGRAM OF FILE RECORDING METHOD PROGRAM OF FILE REPRODUCING METHOD PROGRAM OF FILE EDITING METHOD

(75) Inventors: Fumitaka Kawate, Kanagawa (JP); Mitsuhiro Hirabayashi, Tokyo (JP); Makoto Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 147 days.

(21) Appl. No.: 10/595,560

(22) PCT Filed: Oct. 21, 2004

(86) PCT No.: PCT/JP2004/015963

§ 371 (c)(1),
(2), (4) Date: May 18, 2006

(87) PCT Pub. No.: WO2005/041570

PCT Pub. Date: May 6, 2005

(65) Prior Publication Data

US 2007/0104466 A1 May 10, 2007

(30) Foreign Application Priority Data

Oct. 29, 2003 (JP) ............................. 2003-368318

(51) Int. Cl.
*G06F 17/30* (2006.01)

(52) U.S. Cl. .......................... 707/205; 386/52; 386/98; 396/98; 396/124

(58) Field of Classification Search ...................... None
See application file for complete search history.

(56) References Cited

U.S. PATENT DOCUMENTS

| | | | | |
|---|---|---|---|---|
| 5,737,639 | A * | 4/1998 | Ohmori ........................ 710/73 |
| 5,751,356 | A * | 5/1998 | Suzuki ................... 375/240.01 |
| 5,774,623 | A * | 6/1998 | Maeda et al. ................. 386/98 |
| 5,933,570 | A * | 8/1999 | Fujita .......................... 386/96 |
| 6,185,229 | B1 * | 2/2001 | Obikane et al. ............. 370/537 |
| 6,195,503 | B1 * | 2/2001 | Ikedo et al. .................. 386/104 |
| 6,249,641 | B1 * | 6/2001 | Yokota ......................... 386/94 |
| 6,266,483 | B1 * | 7/2001 | Okada et al. ................. 386/128 |
| 6,285,826 | B1 * | 9/2001 | Murase et al. ............... 386/125 |
| 6,393,206 | B1 * | 5/2002 | Yagi et al. .................... 386/125 |
| 6,744,975 | B1 * | 6/2004 | Kimura ....................... 386/98 |
| 6,807,363 | B1 * | 10/2004 | Abiko et al. .................. 386/68 |

(Continued)

FOREIGN PATENT DOCUMENTS

JP 10-234014 9/1998

(Continued)

*Primary Examiner*—Pierre M Vital
*Assistant Examiner*—Augustine Obisesan
(74) *Attorney, Agent, or Firm*—K&L Gates LLP

(57) ABSTRACT

The present invention is applied to a videodisc device for example, sets information necessary for reproducing a multiplexed stream, and information necessary for reproducing streams making up this multiplexed stream to one of blocks serving as management information, and assigns this multiplexed stream to the track corresponding to the block serving as this management information.

24 Claims, 23 Drawing Sheets

U.S. PATENT DOCUMENTS

| | | |
|---|---|---|
| 7,103,265 B2 * | 9/2006 | Iwasaki et al. ............... 386/104 |
| 2002/0015581 A1 * | 2/2002 | Ando et al. .................... 386/95 |
| 2002/0057705 A1 * | 5/2002 | Hagai et al. .................. 370/410 |
| 2003/0007784 A1 | 1/2003 | Loui et al. |
| 2003/0093634 A1 | 5/2003 | Yamada et al. |
| 2004/0267821 A1 * | 12/2004 | Kiyama et al. ............... 707/200 |
| 2005/0157599 A1 * | 7/2005 | Kiyama et al. ........... 369/30.03 |

FOREIGN PATENT DOCUMENTS

| | | |
|---|---|---|
| JP | 2001-359072 | 12/2001 |
| JP | 2002-197839 | 7/2002 |
| JP | 2003-022653 | 1/2003 |
| JP | 2003-111015 | 4/2003 |
| JP | 2003-179859 | 6/2003 |
| JP | 2003-187560 | 7/2003 |
| WO | 03/032636 | 4/2003 |

* cited by examiner

```
Sample Descrption box {
    Size
    Type (='stsd')
    Version
    Flags
    Number of Entries
            Sample Description entry#1
                    :
            Sample Description entry#M
}
```

| RBP | Length | Field Name |
|---|---|---|
| 0 | 4 | Size |
| 4 | 4 | Data Format = P2ST |
| 8 | 2 | Data Reference Index |
| 10 | L_FM1 | Format Atom (1) |
| 10+L_FM1 | L_SD1 | Stream Descriptor Atom (1) |
| 10+L_FM1+LSD1 | L_FM2 | Format Atom (2) |
| 10+L_FM1+LSD1+L_FM2 | L_SD2 | Stream Descriptor Atom (2) |
| ⋮ | ⋮ | ⋮ |

FIG. 6

| RBP | Length | Field Name |
|---|---|---|
| 0 | 4 | Size |
| 4 | 4 | Data Format = P2ST |
| 8 | 2 | Data Reference Index |
| 10 | L_FM1 | Format Atom (Data Format = P2ST) |
| 10+L_FM1 | L_SD1 | Stream Descriptor Atom (SYSTEM INFORMATION) |
| 10+L_FM1+L_SD1 | L_FM2 | Format Atom (Data Format = P2SI) |
| 10+L_FM1+L_SD1+L_FM2 | L_SD2 | Stream Descriptor Atom (SYSTEM AUXILIARY INFORMATION) |
| 10+L_FM1+L_SD1+L_FM2+L_SD2 | L_FM3 | Format Atom (Data Format = vide) |
| 10+L_FM1+L_SD1+L_FM2+L_SD2+L_FM3 | L_SD3 | Stream Descriptor Atom (INFORMATION RELATING TO VIDEO STREAM) |
| 10+L_FM1+L_SD1+L_FM2+L_SD2+L_FM3+L_SD3 | L_FM4 | Format Atom (Data Format = soun) |
| 10+L_FM1+L_SD1+L_FM2+L_SD2+L_FM3+L_SD3+L_FM4 | L_SD4 | Stream Descriptor Atom (INFORMATION RELATING TO SOUND STREAM 1) |
| 10+L_FM1+L_SD1+L_FM2+L_SD2+L_FM3+L_SD3+L_FM4+L_SD4 | L_FM5 | Format Atom (Data Format = soun) |
| 10+L_FM1+L_SD1+L_FM2+L_SD2+L_FM3+L_SD3+L_FM4+L_SD4+L_FM5 | L_SD5 | Stream Descriptor Atom (INFORMATION RELATING TO SOUND STREAM 2) |

FIG. 7

| RBP | Length | Field Name |
|---|---|---|
| 0 | 4 | Size |
| 4 | 4 | Type = strd |
| 8 | 1 | Version |
| 9 | 3 | Flags |
| 12 | 4 | Data Format = P2SI |
| 16 | 2 | Video Stream Status Flags |
| 18 | 2 | Number of Streams |
| 20 | 8 * Number of Streams | Stream Information |

FIG. 8

| Bit | Flag Name | Description |
|---|---|---|
| 15:1 | Reserved | |
| 0 | CLOSED GOP | WHEN THIS FLAG IS 1, IT SHOWS THAT THE VIDEO STREAM IS CONFIGURED OF CLOSED GOPS ALONE |

FIG. 9

| RBP | Length | Field Name |
|---|---|---|
| 0 | 4 | Stream Identifier |
| 4 | 4 | Stream Property |

FIG. 10

| RBP | Length | Field Name |
|---|---|---|
| 0 | 4 | Size |
| 4 | 4 | Type = tkpt |
| 8 | 1 | Version |
| 9 | 3 | Flags |
| 12 | 4 | Presentation Type |
| 16 | 4 | Priority |

FIG. 11

| Track ID | Media | Type of Data | Priority |
|---|---|---|---|
| 1 | MPEG-2 PS | VIDEO STREAM WITHIN MPEG-2 PS | 1 |
| | | SOUND STREAM (1) (VOICE) WITHIN MPEG-2 PS | 2 |
| | | SOUND STREAM (2) (SOUND EFFECT) WITHIN MPEG-2 PS | 20 |
| 2 | Sound | SOUND TRACK (BGM-1) | 10 |
| 3 | Sound | SOUND TRACK (BGM-2) | 3 |

FIG. 13

| RBP | Length | Field Name |
|---|---|---|
| 0 | L_SC1 | Stream Control Element-1 |
| L_SC1 | L_SC2 | Stream Control Element-2 |
| : | : | : |

FIG. 14

| RBP | Length | Field Name |
|---|---|---|
| 0 | 2 | Size |
| 2 | 2 | Control Command |
| 4 | 2 | Stream Identifier |
| 6 | N | Control Data |

FIG. 15

| Control Command | Description | Control Data Size |
|---|---|---|
| 1 | PROPRIETY OF STREAM REPRODUCTION | 2 |

FIG. 16

| Control Data | Description |
|---|---|
| 0 | disable THE STREAMS HAVING THE SAME STREAM IDENTIFIER AS THE VALUE OF Stream Identifier |
| 1 | enable THE STREAMS HAVING THE SAME STREAM IDENTIFIER AS THE VALUE OF Stream Identifier |

FIG. 17

| |
|---|
| size = 8 |
| Control Command = 1 |
| Stream Identifier = ID2 |
| Control Data = 1 (enable) |
| size = 8 |
| Control Command = 1 |
| Stream Identifier = ID3 |

FIG. 18

| |
|---|
| size = 8 |
| Control Command = 1 |
| Stream Identifier = ID2 |
| Control Data = 0 |
| size = 8 |
| Control Command = 1 |
| Stream Identifier = ID3 |
| Control Data = 0 |

FIG. 24

| Track ID | Media | Type of Data | Ratio |
|---|---|---|---|
| 1 | MPEG-2 PS | VIDEO STREAM WITHIN MPEG-2 PS | 1.0 |
| | | SOUND STREAM (1) (VOICE) WITHIN MPEG-2 PS | 1.0 |
| | | SOUND STREAM (2) (SOUND EFFECT) WITHIN MPEG-2 PS | 0.5 |
| 2 | Sound | SOUND TRACK (BGM-1) | 0.5 |
| 3 | Sound | SOUND TRACK (BGM-2) | 1.0 |

FILE RECORDING DEVICE, FILE REPRODUCING DEVICE, FILE EDITING DEVICE, FILE RECORDING METHOD, FILE REPRODUCING METHOD, FILE EDITING METHOD, PROGRAM OF FILE RECORDING METHOD PROGRAM OF FILE REPRODUCING METHOD PROGRAM OF FILE EDITING METHOD

CROSS REFERENCE TO RELATED APPLICATIONS

The present application claims priority to Japanese Patent Document No. P2003-368318 filed on Oct. 29, 2003, the disclosure of which is herein incorporated by reference.

BACKGROUND

The present invention relates to a file recording device, a file reproducing device, a file editing device, a file recording method, a file reproducing method, a file editing method, a program of a file recording method, a program of a file reproducing method, a program of a file editing method, a recording medium recording a program of a file recording method, a recording medium recording a program of a file reproducing method, a recording medium recording a program of a file editing method, a recording medium, and can be applied to a videodisc device for example The present invention sets information necessary for reproducing a multiplexed stream, and information necessary for reproducing a stream making up this multiplexed stream to one of blocks serving as management information, and assigns this multiplexed stream to the track corresponding to the block serving as this management information, thereby recording a program stream and the like in a QT file or the like, and further enabling this to be processed.

Heretofore, a QuickTime (hereinafter, referred to as QT) file format has been widely known as a file format corresponding to multimedia. Here, the QT format is a file format produced as an enhancement function of OS (Operating System) for reproducing animation or the like without using special hardware, and is a multimedia file format of time base which can reproduce actual data in various formats such as animation, audio, still images, characters, and MIDI and the like synchronously on one time axis.

With a QT file, actual data such as these animation, still images, and audio and the like is put together into a block, and management information for managing this actual data is put together into a block separately from this actual data block. Hereinafter, such a block is referred to as an atom. Also, each of the atoms made up of such actual data and management information is further divided into blocks using a hierarchical structure, and as for actual data, each actual data is stored as media data and as an individual track, and with a QT file, the track of actual data serving as animation, audio, or characters is referred to as a video track, sound track (audio track), or text track.

On the other hand, as for an atom serving as management information, the track atom serving as the management information corresponding to the track of each actual data is formed for each actual data using a hierarchical structure, and with a QT file, a sample description atom is assigned to a track atom serving as middle-level hierarchical management information conforming to this hierarchical structure, and the type and content of the corresponding actual data can be recognized with this sample description atom. With the conventional QT file, the track serving as this management information has been arranged so as to be created under the condition that a single type of actual data is stored, and thus, with a sample description atom, only information regarding an elementary stream according to single sound and video has been described.

Thus, equipment, which cannot control all of the tracks regarding a QT file made up of multiple tracks, has been arranged so as to exclude this file from an object to be reproduced, or so as to reproduce the actual data assigned to each track within a reproducible range based on the track ID serving as an identifier set to each track. Thus, in this case, an arrangement has been made wherein a user cannot view and listen to this file at all, or views and listens to the reproducing state of the track selected by the track ID regardless of the content of the file. Accordingly, for example, with Japanese Unexamined Patent Application Publication No. 2003-179859, a method for setting priorities to tracks serving as actual data, and further reproducing the actual data within a reproducible range in accordance with these priorities has been proposed, and according to this method, even with equipment of which reproducing function is restricted, a file is arranged so as to be appropriately reproduced depending on the content of the file.

Now, in recent years, with satellite broadcasting and the like, various programs and so forth have been provided using a program stream conforming to the MPEG-2 system. Thus, it is conceived as convenient that even a stream in which the elementary streams of video and sound are multiplexed, such as a program stream conforming to the MPEG-2 system, can be recorded using the QT format, and accordingly, there are expectations that even a program stream and the like can be recorded using a QT file.

However, as described above, with the QT format, the track serving as management information is premised on a single type of actual data, so the actual data of a format in which video data and sound data are mixed such as the program stream conforming to the MPEG-2 system cannot be managed, and thus resulting in a problem wherein this type of multiplexed stream cannot be recorded in the QT format.

Moreover, thus the track serving as management information is premised on a single type of actual data, and accordingly, it is needless to say that even if the program stream conforming to the MPEG-2 system is recorded with the QT format, the priorities at the time of reproduction cannot be set to the multiple elementary streams making up this program stream. On the other hand, in some cases, sound data and the like using multiple channels are assigned even to the program stream conforming to the MPEG-2 system, as with the case in which multiple sound tracks are provided in a QT file.

Thus, even if the actual data in a format in which video data and sound data are mixed can be recorded with the QT format, the issue solved by the technique of Japanese Unexamined Patent Application Publication No. 2003-179859 becomes a problem again. That is to say, in the event that sound data and the like using multiple channels are assigned, it becomes impossible to appropriately reproduce these depending on the content of the file.

Accordingly, there are expectations that with a stream in which video data and sound data are multiplexed can be recorded with a QT file, and even with equipment of which the function is limited, the elementary streams making up this multiplexed stream can be appropriately reproduced depending on the content of the file.

Also, with the program stream conforming to the MPEG-2 system, not only so-called closed GOP (Group of Pictures) but also open GOP are applied thereto in some cases. Here, closed GOP are in a form in which P pictures, the reference frames of B pictures, and fields are all set within the same GOP, and on the other hand, open GOP are in a form in which any of P pictures, the reference frames of B pictures, and fields are set within another GOP immediately before this GOP. Thus, processing needs to be changed at the time of reproduction depending on whether GOP to be applied is closed GOP or open GOP. Now, GOP is the processing units of encoding processing in which frames are set as units, for example, in the case of MPEG, the processing units are set to 15 frames.

On the other hand, even if actual data in a format in which video data and sound data are multiplexed can be recorded with the QT format, when determining closed GOP and open GOP at the time of reproduction, consequently determination cannot be made unless the actual data is reproduced, and also the description of the sequence header set in this actual data is referenced, and thus resulting in a problem in which the amount of processing at the time of reproduction extremely increases.

Accordingly, there are expectations for the stream to be in a form in which video data and sound data are mixed is arranged so as to be recorded using a QT file, and also even in the event of closed GOP and open GOP being mixed, the amount of the processing can be prevented effectively from increasing.

SUMMARY

The present invention has been made in light of the above points, and is for proposing a file recording device, a file reproducing device, a file editing device, a file recording method, a file reproducing method, a file editing method, a program of a file recording method, a program of a file reproducing method, a program of a file editing method, a recording medium recording a program of a file recording method, a recording medium recording a program of a file reproducing method, a recording medium recording a program of a file editing method, and a recording medium, wherein the stream in which video data and sound data are multiplexed is recorded using a QT file or the like, and further can be processed.

In order to solve the above problems, the present invention is applied to a file recording device for recording actual data in a recording medium as a file with a predetermined format, wherein a stream in which video data serving as a stream and sound data serving as a stream are multiplexed is assigned to one piece of the actual data to form the actual data block, the middle-level hierarchical management information block corresponding to the multiplexed stream is formed, information necessary for reproducing the multiplexed stream, information necessary for reproducing the video data serving as the stream, and information necessary for reproducing the sound data serving as the stream are set to the low-level hierarchical block of the middle-level hierarchical management information block, and the multiplexed stream is recorded in the recording medium.

The configuration of the present invention is applied to a file recording device for recording actual data in a recording medium as a file with a predetermined format, wherein a stream in which video data serving as a stream and sound data serving as a stream are multiplexed is assigned to one piece of the actual data to form the actual data block, the middle-level hierarchical management information block corresponding to the multiplexed stream is formed, information necessary for reproducing the multiplexed stream, information necessary for reproducing the video data serving as the stream, and information necessary for reproducing the sound data serving as the stream are set to the low-level hierarchical block of the middle-level hierarchical management information block, and are recorded in the recording medium, whereby the stream in which the video data serving as the stream and the sound data serving as the stream are multiplexed can be recorded in a file such as a QT file in which the track serving as management information is premised on a single type of actual data, and this stream can be set to be distinguishable. Thus, the program stream or the like in which video data and sound data are mixed can be recorded using a QT file.

Also, the present invention is applied to a file reproducing device for reproducing and outputting a file recorded in a predetermined recording medium, wherein with the file, a stream in which video data serving as a stream and sound data serving as a stream are multiplexed is assigned to one piece of the actual data to form the actual data block, the middle-level hierarchical management information block corresponding to the multiplexed stream is formed, information necessary for reproducing the multiplexed stream, information necessary for reproducing the video data serving as the stream, and information necessary for reproducing the sound data serving as the stream are set to the low-level hierarchical block of the middle-level hierarchical management information block; and wherein the file reproducing device processes the data of the file to be reproduced from the recording medium based on the information necessary for reproduction set to the low-level hierarchical block to reproduce the video data serving as the stream and the sound data serving as the stream.

Also, the present invention is applied to a file editing device for editing a file with a predetermined format, wherein with the file, a stream in which video data serving as a stream and sound data serving as a stream are multiplexed is assigned to one piece of the actual data to form the actual data block, the middle-level hierarchical management information block corresponding to the multiplexed stream is formed, information necessary for reproducing the multiplexed stream, information necessary for reproducing the video data serving as the stream, and information necessary for reproducing the sound data serving as the stream are set to the low-level hierarchical block of the middle-level hierarchical management information block; and wherein the file editing device processes the file based on the information necessary for reproduction set to the low-level hierarchical block.

According to these configurations of the present invention, the stream in a form in which video data and sound data are thus mixed can be recorded using a QT file or the like, and this file can be reproduced and subjected to editing processing.

Also, the present invention is applied to a file recording method for recording actual data in a recording medium as a file with a predetermined format, wherein with the file recording method, a stream in which video data serving as a stream and sound data serving as a stream are multiplexed is assigned to one piece of the actual data to form the actual data block, the middle-level hierarchical management information block corresponding to the multiplexed stream is formed, information necessary for reproducing the multiplexed stream, information necessary for reproducing the video data serving as the stream, and information necessary for reproducing the sound data serving as the stream are set to the low-level hierarchical block of the middle-level hierarchical management information block, and the multiplexed stream is recorded in the recording medium.

Also, the present invention is applied to a file reproducing method for reproducing and outputting a file recorded in a predetermined recording medium, wherein with the file, a stream in which video data serving as a stream and sound data serving as a stream are multiplexed is assigned to one piece of the actual data to form the actual data block, the middle-level hierarchical management information block corresponding to the multiplexed stream is formed, information necessary for reproducing the multiplexed stream, information necessary for reproducing the video data serving as the stream, and information necessary for reproducing the sound data serving as the stream are set to the low-level hierarchical block of the middle-level hierarchical management information block; and wherein the file reproducing method processes the data of the file to be reproduced from the recording medium based on the information necessary for reproduction set to the low-level hierarchical block to reproduce the video data serving as the stream and the sound data serving as the stream.

Also, the present invention is applied to a file editing method for editing a file with a predetermined format, wherein with the file, a stream in which video data serving as a stream and sound data serving as a stream are multiplexed is assigned to one piece of the actual data to form the actual data block, the middle-level hierarchical management information block corresponding to the multiplexed stream is formed, information necessary for reproducing the multiplexed stream, information necessary for reproducing the video data serving as the stream, and information necessary for reproducing the sound data serving as the stream are set to the low-level hierarchical block of the middle-level hierarchical management information block; and wherein the file editing method processes the file based on the information necessary for reproduction set to the low-level hierarchical block.

According to this configurations of the present invention, the file recording method, file reproducing method, and file editing method can be provided wherein the program stream or the like can be recorded using a QT file, and further can be processed.

Also, the present invention is applied to a program regarding a file recording method for recording actual data in a recording medium as a file with a predetermined format, wherein the program regarding a file recording method comprises: a step for assigning a stream in which video data serving as a stream and sound data serving as a stream are multiplexed to one piece of the actual data to form the actual data block; and a step for forming the middle-level hierarchical management information block corresponding to the multiplexed stream, and also setting information necessary for reproducing the multiplexed stream, information necessary for reproducing the video data serving as the stream, and information necessary for reproducing the sound data serving as the stream to the low-level hierarchical block of the middle-level hierarchical management information block.

Also, the present invention is applied to a program regarding a file reproducing method for reproducing and outputting a file recorded in a predetermined recording medium, wherein with the file, a stream in which video data serving as a stream and sound data serving as a stream are multiplexed is assigned to one piece of the actual data to form the actual data block, the middle-level hierarchical management information block corresponding to the multiplexed stream is formed, information necessary for reproducing the multiplexed stream, information necessary for reproducing the video data serving as the stream, and information necessary for reproducing the sound data serving as the stream are set to the low-level hierarchical block of the middle-level hierarchical management information block; and wherein the program regarding a file reproducing method includes a step for processing the data of the file to be reproduced from the recording medium based on the information necessary for reproduction set to the low-level hierarchical block to reproduce the video data serving as the stream and the sound data serving as the stream.

Also, the present invention is applied to a program regarding a file editing method for editing a file with a predetermined format, wherein with the file, a stream in which video data serving as a stream and sound data serving as a stream are multiplexed is assigned to one piece of the actual data to form the actual data block, the middle-level hierarchical management information block corresponding to the multiplexed stream is formed, information necessary for reproducing the multiplexed stream, information necessary for reproducing the video data serving as the stream, and information necessary for reproducing the sound data serving as the stream are set to the low-level hierarchical block of the middle-level hierarchical management information block; and wherein the program regarding a file editing method includes a step for processing the file based on the information necessary for reproduction set to the low-level hierarchical block.

According to these configurations of the present invention, the program regarding a file recording method, program regarding a file reproducing method, and program regarding a file editing method can be provided wherein the program stream or the like can be recorded using a QT file, and further can be processed.

Also, the present invention is applied to a recording medium recording a program regarding a file recording method for recording actual data in a recording medium as a file with a predetermined format, wherein the program regarding a file recording method comprises: a step for assigning a stream in which video data serving as a stream and sound data serving as a stream are multiplexed to one piece of the actual data to form the actual data block; and a step for forming the middle-level hierarchical management information block corresponding to the multiplexed stream, and also setting information necessary for reproducing the multiplexed stream, information necessary for reproducing the video data serving as the stream, and information necessary for reproducing the sound data serving as the stream to the low-level hierarchical block of the middle-level hierarchical management information block.

Also, the present invention is applied to a recording medium recording a program regarding a file reproducing method for reproducing and outputting a file recorded in a predetermined recording medium, wherein with the file, a stream in which video data serving as a stream and sound data serving as a stream are multiplexed is assigned to one piece of the actual data to form the actual data block, the middle-level hierarchical management information block corresponding to the multiplexed stream is formed, information necessary for reproducing the multiplexed stream, information necessary for reproducing the video data serving as the stream, and information necessary for reproducing the sound data serving as the stream are set to the low-level hierarchical block of the middle-level hierarchical management information block; and wherein the program regarding a file reproducing method includes a step for processing the data of the file to be reproduced from the recording medium based on the information necessary for reproduction set to the low-level hierarchical block to reproduce the video data serving as the stream and the sound data serving as the stream.

Also, the present invention is applied to a recording medium recording a program regarding a file editing method for editing a file with a predetermined format, wherein with the file, a stream in which video data serving as a stream and sound data serving as a stream are multiplexed is assigned to one piece of the actual data to form the actual data block, the middle-level hierarchical management information block corresponding to the multiplexed stream is formed, information necessary for reproducing the multiplexed stream, information necessary for reproducing the video data serving as the stream, and information necessary for reproducing the sound data serving as the stream are set to the low-level hierarchical block of the middle-level hierarchical management information block; and wherein the program regarding a file editing method includes a step for processing the file based on the information necessary for reproduction set to the low-level hierarchical block.

According to these configurations of the present invention, the recording medium recording a program regarding a file recording method, recording medium recording a program regarding a file reproducing method, and recording medium recording a program regarding a file editing method can be provided wherein the program stream or the like can be recorded using a QT file, and further can be processed.

Also, the present invention is applied to a recording medium recording a file with a predetermined format, wherein with the file, a stream in which video data serving as a stream and sound data serving as a stream are multiplexed is assigned to one piece of the actual data to form the actual data block, the middle-level hierarchical management information block corresponding to the multiplexed stream is formed, information necessary for reproducing the multiplexed stream, information necessary for reproducing the video data serving as the stream, and information necessary for reproducing the sound data serving as the stream are set to the low-level hierarchical block of the middle-level hierarchical management information block.

According to this configuration of the present invention, the recording medium recording a file with such a format can be provided.

According to the present invention, the stream in which video data and sound data are multiplexed is recorded using a QT file or the like, and further can be processed.

Additional features and advantages of the present invention are described in, and will be apparent from, the following Detailed Description and the Figures.

BRIEF DESCRIPTION OF THE FIGURES

FIG. 6 is a chart showing a specific example of the sample description entry in FIG. 5.

FIG. 7 is a chart showing a stream description atom.

FIG. 8 is a chart showing the video stream flag of the stream description atom in FIG. 7.

FIG. 9 is a chart showing the stream information of the stream description atom in FIG. 7.

FIG. 10 is a chart showing a track property atom.

FIG. 11 is a chart serving for describing a program stream.

FIG. 13 is a chart showing sample data of a stream control track.

FIG. 14 is a chart showing the stream control element according to the sample data in FIG. 13.

FIG. 15 is a chart showing a control command.

FIG. 16 is a chart showing control data.

FIG. 17 is a chart showing a specific example of a stream control track.

FIG. 18 is a chart showing another specific example of a stream control track.

FIG. 24 is a diagram showing the ratios set by the processing in FIG. 23.

DETAILED DESCRIPTION

Hereinafter, description will be made in detail regarding the embodiments of the present invention with reference to the drawings as appropriate.

Figure 1:
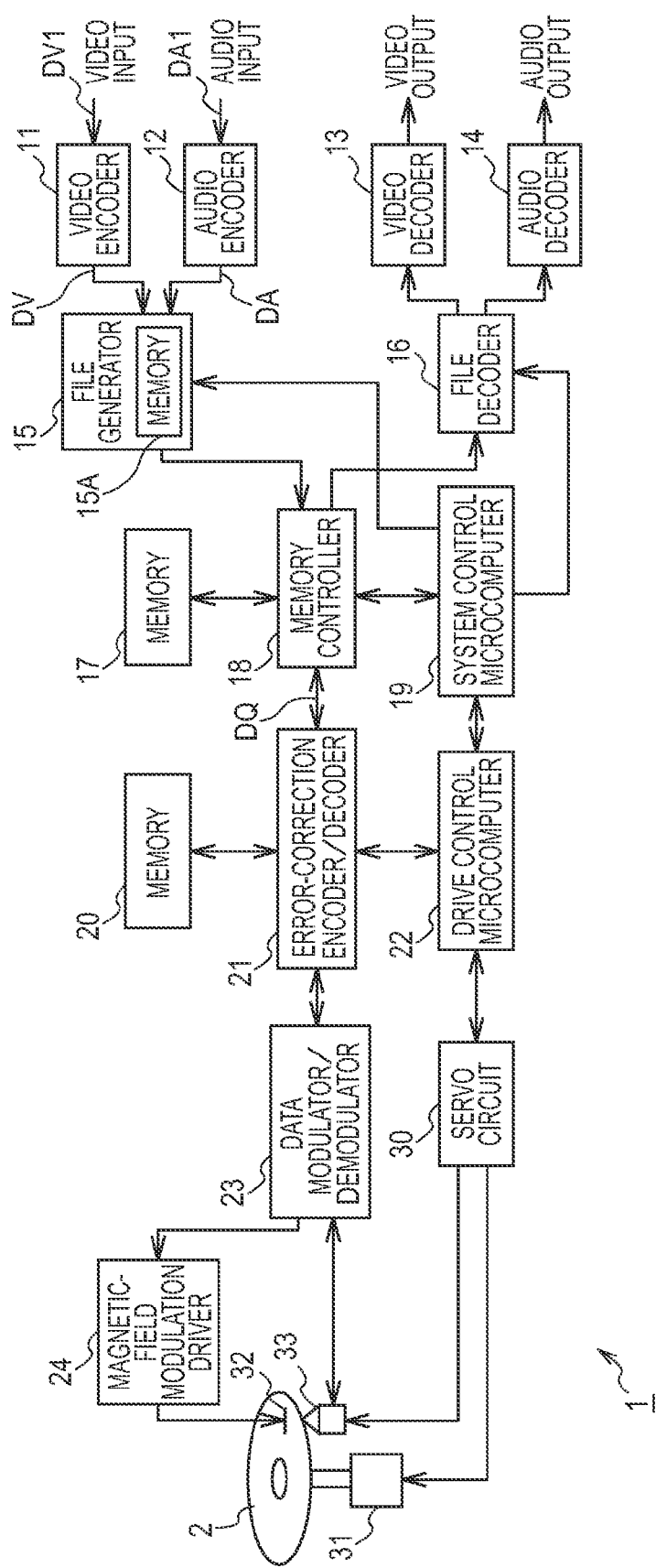
FIG. 1 is a block diagram illustrating a videodisc device according to a First Embodiment of the present invention.

(1) Configuration of First Embodiment (1-1) Overall Configuration of Videodisc Device FIG. 1 is a block diagram illustrating a videodisc device according to a First Embodiment of the present invention. This videodisc device 1 acquires the video signal and sound signal of a subject using unshown imaging means and audio acquisition means, and records the imaging results of these video signal and sound signal in an optical disc 2. Also, the videodisc device 1 reproduces the imaging results recorded in this optical disc 2 to output these to a liquid crystal display panel serving as display means, a speaker serving as audio output means, or external equipment. Further, the videodisc device 1 thus provides the imaging results to a user, and subjects the imaging results to editing processing in response to the operations by the user.

With this videodisc device 1, an arrangement is made wherein following the video signal and sound signal serving as such imaging results being subjected to multiplexing with the program stream conforming to the MPEG-2 system, the multiplexed signals are recorded in the optical disc 2 using a predetermined file format, and with this embodiment, the QT format is employed as this file format.

Thus, with the videodisc device 1, a video encoder 11 subjects a video signal DV1 serving as the imaging result to analog-to-digital conversion processing to generate video data, subjects this video data to encoding processing in accordance with the MPEG format, and thus outputs an elementary stream DV serving as the video data.

Similarly, an audio encoder 12 subjects an audio signal DA1 serving as the imaging result to analog-to-digital conversion processing to generate sound data, subjects this sound data to encoding processing in accordance with the MPEG format, and thus outputs an elementary stream DA serving as the audio data.

A file generator 15, when recording, synchronizes the elementary streams DA and DV output from the video encoder 11 and audio encoder 12, subjects these to multiplexing processing, and thus creates a program stream conforming to the MPEG-2 system. Also, the file generator 15 generates a QT file using this program stream under control of a system control microcomputer 19. The file generator 15 sequentially generates program stream data by multiplexing the elementary streams DA and DV which are input sequentially, and sequentially setting a sequence header and the like. Also, the file generator 15 generates and outputs the data of a media data atom which is the atom of actual data in a QT file using this program stream data. Also, with this series of processing, the file generator 15 additionally writes and retains data necessary for generating a movie atom in built-in memory 15A, corresponding to the data of this media data atom, generates the data sequence of the movie atom from the data retained in the memory 15A according to completion of recording of the media data atom, and outputs this.

A memory controller 18 switches its operation under control of the system control microcomputer 19, and when recording, sequentially records the data sequence of the QT file output from this file generator 15 in memory 17, temporarily retains this, and outputs the retained data for the subsequent processing of an error-correction encoder/decoder 21. Also, when performing reproduction, contrary to this, the memory controller 18 temporarily retains the output data of the error-correction encoder/decoder 21, and outputs this to a file decoder 16 and the system control microcomputer 19.

The error-correction encoder/decoder 21 switches its operation under control of the system control microcomputer 19, and when recording, temporarily records the output data of the memory controller 18 in memory 20, and appends an error correction code thereto. Also, the error-correction encoder/decoder 21 thus reads out and outputs the data retained in the memory 20 in a predetermined sequence, thereby subjecting these data to interleave processing to output these to a data modulator/demodulator 23. Also, the error-correction encoder/decoder 21, when performing reproduction, contrary to when recording, temporarily records the data output from the data modulator/demodulator 23 in the memory 20 and outputs this to the memory controller 18 in a predetermined sequence, thereby subjecting the data output from this data modulator/demodulator 23 to interleave processing, and outputting this. At this time, the error-correction encoder/decoder 21 also performs error correction processing based on the error correction code appended when recording.

The data modulator/demodulator 23 switches its operation under control of the system control microcomputer 19, and when recording, converts the output data of the error-correction encoder/decoder 21 into serial data sequence, following which subjects this to modulation processing to output this to a magnetic-field modulation driver 24 or an optical pickup 33. Also, when performing reproduction, the data modulator/demodulator 23 reproduces a clock from the reproducing signal output from the optical pickup 33, and subjects the reproducing signal to binary identification and demodulation processing based on this clock, thereby obtaining the reproduction data corresponding to the serial data sequence generated when recording, and outputting this reproduction data to the error-correction encoder/decoder 21.

The magnetic-field modulation driver 24, in the event that the optical disc 2 is a magneto-optic disc, when recording, under control of the system control microcomputer 19, drives a magnetic head 32 based on the output signal of the data modulator/demodulator 23. Here, the magnetic head 32 is retained so as to face the optical pickup 33 sandwiching the optical disc 2 therebetween, and applies modulation magnetic field according to the output data of the data modulator/demodulator 23 to the laser beam irradiation position of the optical pickup 33. Thus, with this videodisc device 1, an arrangement is made wherein in the event that the optical disc 2 is a magneto-optic disc, imaging results are recorded in the optical disc 2 as a file with the QT format by employing a thermo-magnetism recording technique.

The optical disc 2 is a disc-shaped recording medium, and with this embodiment, a rewritable optical disc such as a magneto-optic disc (MO: magneto-optical disk) and a phase-change-type disc. A spindle motor 31 subjects the optical disc 2 to rotational driving under control of a servo circuit 30 based on conditions such as CLV (Constant Linear Velocity), CAV (Constant Angular Velocity), and ZCLV (Zone Constant Linear Velocity) depending on the optical disc 2.

The servo circuit 30, based on the various signals output from the optical pickup 33, controls operation of the spindle motor 31, and thus executes spindle control processing. Also, the servo circuit 30 similarly subjects the optical pickup 33 to tracking control and focus control, also controls the optical pickup 33 and the magnetic head 32 to seek, and further executes processing such as focus search.

A drive control microcomputer 22 controls operation of the servo circuit 30, such as seek, in accordance with the instructions of the system control microcomputer 19.

The optical pickup 33 casts a laser beam to the optical disc 2, and receives the returned light thereof at a predetermined light receiving element, and subjects the received light to arithmetic processing, and thus, generates and outputs various control signals, and also outputs a reproducing signal of which signal level changes depending on the pit sequence and mark sequence formed on the optical disc 2. Also, the optical pickup 33 switches its operation under control of the system control microcomputer 19, and in the event that the optical disc 2 is a magneto-optic disc, when recording, intermittently raises the light volume of the laser beam to be cast to the optical disc 2. Thus, with this videodisc device 1, an arrangement is made wherein imaging results are recorded in the optical disc 2 using a so-called pulse-train method. Also, the optical pickup 33, in the event that the optical disc 2 is a phase-change-type disc or the like, raises the light volume of the laser beam to be cast to the optical disc 2 from the light volume when performing reproduction to the light volume when writing depending on the output data of the data modulator/demodulator 23, and thus records imaging results in the optical disc 2 by employing a thermal recording technique.

According to the above arrangements, with this videodisc device 1, the video encoder 11 and the audio encoder 12 subjects the video signal and sound signal serving as imaging results to data compression to convert these into elementary streams, following which the file generator 15 generates a program stream conforming to the MPEG-2 system, further converts this program stream into a QT format file, and the optical pickup 33, or the optical pickup 33 and magnetic-field head 32 record this in this optical disc 2 through the memory controller 18, error-correction encoder/decoder 21, and data modulator/demodulator 23 sequentially.

Also, with the videodisc device 1, an arrangement is made wherein the data modulator/demodulator 23 processes the reproducing signal obtained by the optical pickup 33 to obtain reproduction data, the error-correction encoder/decoder 21 processes this reproduction data so as to enable the file with the QT format recorded in the optical disc 2 to be reproduced, and the memory controller 18 outputs this file data in the QT format.

The file decoder 16 inputs the data of the QT file output from the memory controller 18, disassembles this data into the elementary streams of video data and sound data, and outputs these. With this processing, the file decoder 16 acquires and retains the data of a movie atom beforehand under control, such as seek, of the system control microcomputer 19, and outputs the elementary streams of the video data and sound data based on the management information set to this movie atom.

A video decoder 13 subjects the elementary stream of this video data to data decompression to output this to unshown display means, or external equipment. An audio decoder 14 subjects the elementary stream of the sound data output from the file decoder 16 to data decompression to output this to unshown audio output means, or external equipment. Thus, this videodisc device 1 outputs the imaging results reproduced from the optical disc 2 so as to be capable of monitoring.

The system control microcomputer 19 is a microcomputer for controlling operation of this entire videodisc device 1, and controls operation of each unit in response to the user operations by executing a predetermined processing program recorded in unshown memory. Thus, the system control microcomputer 19 is arranged so as to record imaging results in the optical disc 2, reproduce the imaging results recorded in this optical disc 2 to provide these to the user, and further execute editing processing thereupon.

Note that with this videodisc device 1, this processing program according to the system control microcomputer 19 is arranged so as to be installed and provided beforehand. However, instead of providing the program by such prior installation, the program may be provided recorded in a recording medium, and installed. Incidentally, as for such a recording medium, various recording media can be widely employed, such as an optical disc, magnetic disk, memory card, and magnetic tape.

(1-2) QT File

Figure 2:
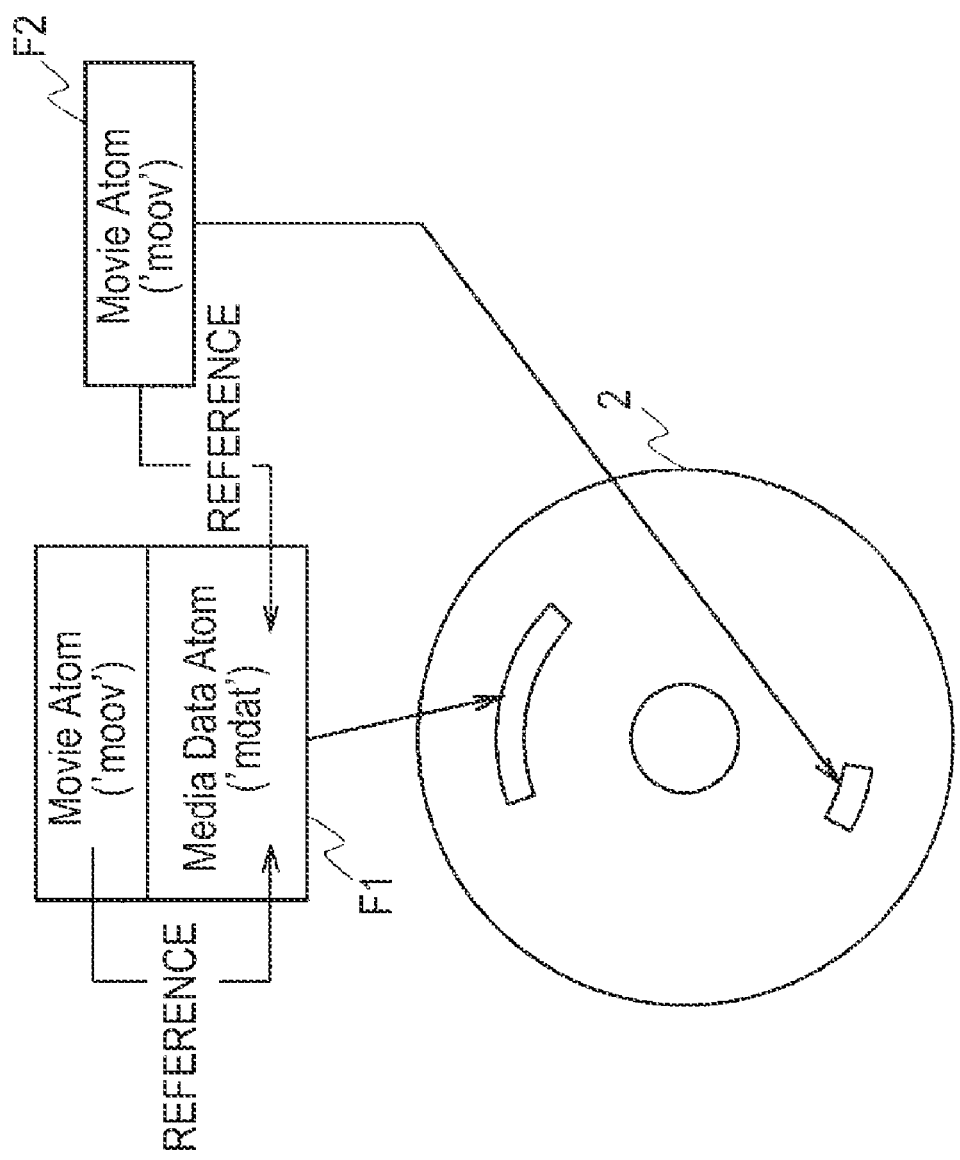
FIG. 2 is a schematic diagram serving for describing the atoms of a QT file.

Now, FIG. 2 is a schematic diagram illustrating the basic configuration of a QT file. With a QT file F1, a media data atom is made up of a collection of tracks of actual data, and a movie atom is formed by putting together the management information of this media data atom, and so forth. Note that here, an atom is also referred to as a box. Also, the media data atom of which the type name is set to "mdat" is also referred to as a movie data atom. On the other hand, the movie atom of which the type name is set to "moov" is also referred to as a movie resource.

As for the QT file F1 and a QT file F2, there are a self-intension-type file F1 in which these media data atom and movie atom are put together, and an external-reference-type file F2 which has a format made up of a movie atom alone, and this external-reference-type F2 is arranged so as to set a media data atom present in another file F1 to an object to be managed, whereby this can be employed for non-destructive editing and so forth. Note that in the event that a media data atom present in another file F1 is taken as an object to be managed, management information such as a relative path and absolute path on the recording medium according to this another file is arranged so as to be assigned to the movie atom as well.

Figure 3:
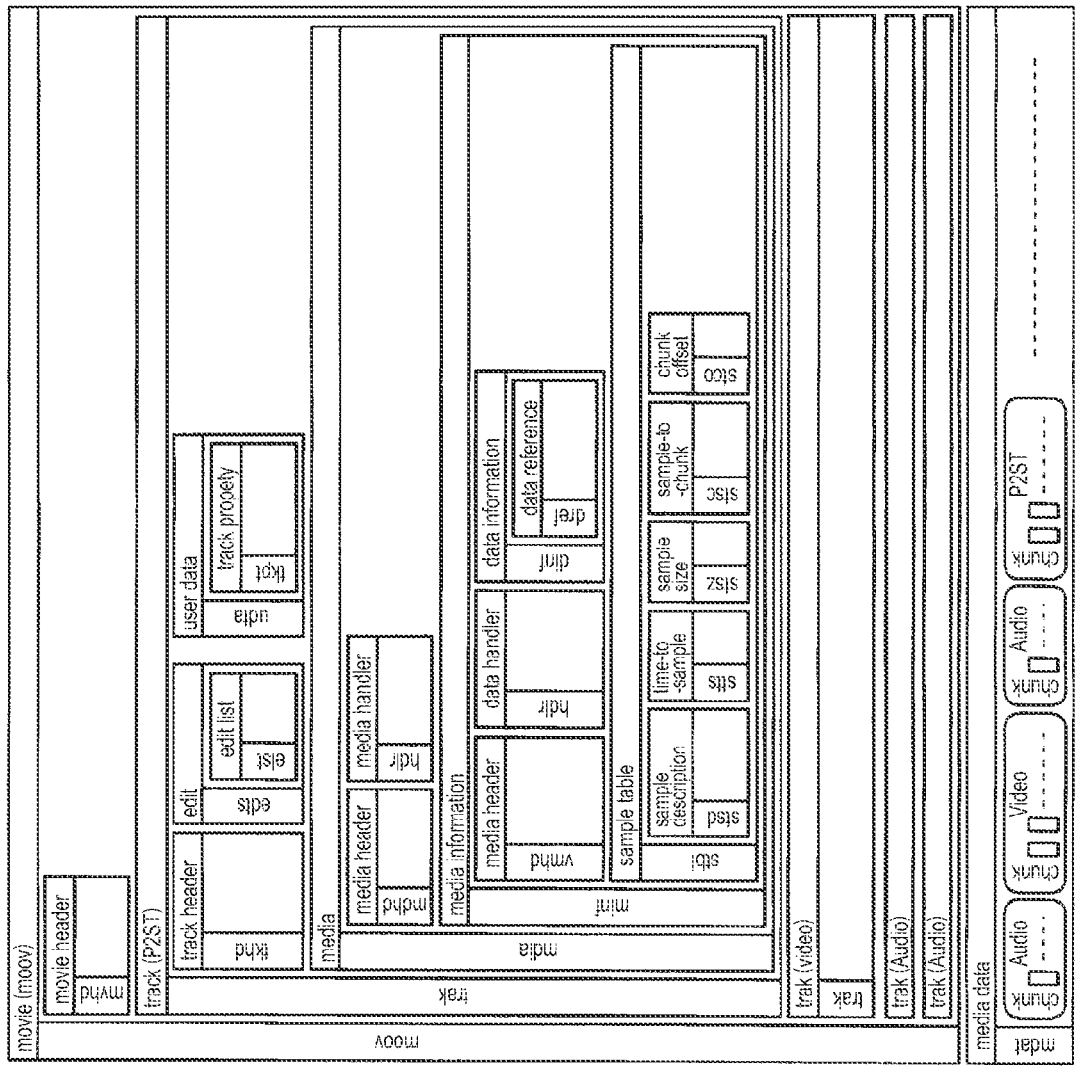
FIG. 3 is a chart serving for describing the format of a QT file.

FIG. 3 is a chart illustrating these media data atom and movie atom in detail regarding the self-intension-type file F1. Note that with the movie atom, track atoms (type name: track) are provided corresponding to actual data serving as a track, and each track atom is configured generally in the same way though the content thereof somewhat differs depending on the type of actual data, so in FIG. 3, the track atom corresponding to the program stream will be described, but description will be omitted regarding the track atoms according to video and sound.

Now, a media data atom is arranged such that the actual data serving as streams of a QT file are assigned to chunks as a sample group respectively, and each actual data serving as a chunk is sequentially cyclically provided. Now, the example in this FIG. 3 is an example in which a program stream, a video stream, and two sound streams are assigned to actual data. Also, in FIG. 3, the rectangular shapes in chunks illustrate samples.

A movie atom is created with a hierarchical structure in which management information is subjected to atomizing for each attribute. That is to say, a movie atom comprises a movie head atom (movie header), track atoms (tracks), and so forth. The movie header atom stores header information, and the type name thereof is set to "mvhd". On the other hand, the track atoms (tracks) corresponding to the tracks provided in a media data atom are provided for each of actual data respectively. Each of the track atoms (tracks) comprises a track header atom (track header), an edit atom (edit), a media atom (media), a user data atom (user data), and so forth, each in which information relating to the respective actual data of the media data atom is described.

The track header atom (track header) stores header information. The edit atom (edit) includes an edit list atom (edit list) as necessary, and is arranged so as to be employed for non-destructive editing by setting information such as time information up to an in point and an out point, and reproduction speed to this edit list atom. Various data which can be defined by the user is assigned to the user data atom (user data), and with this embodiment, later-described priorities when performing reproduction are arranged so as to be defined in the tracks other than a program stream by this user data atom (user data).

The media atom (media) is assigned with information for managing the compression method, storing position, display time, and so forth of corresponding respective actual data, and the type name thereof is set to media. The media atom (media) comprises a media header atom (media header), a media handler reference atom (media handler reference), and media information atom (media information). Here, the media header atom (media header) is assigned with header information, the type name thereof is set depending on the type of corresponding actual data, and as for this type name, the type names corresponding to video, sound, and program stream are prepared. The media handler reference atom (media handler reference (media handler in FIG. 3)) is arranged so as to record the type of corresponding actual data, and thus identify video data, sound data, and so forth.

The media information atom (media information) is assigned with various types of information according to a sample which is the minimum management units, and the type name thereof is set to "minf". The media information atom (media information) comprises a media header (media information header (media header in FIG. 3)), a data handler reference atom (data handler reference (data handler in FIG. 3)), a data information atom (data information), and a sample table atom (sample table), which are corresponding to actual data.

Here, the media header, which corresponds to the upper media handler reference atom (media handler reference), stores the type name, and accommodates the header information. The data handler reference atom (data handler reference)

sets the information relating to handling of the corresponding actual data, and the data information atom (data information) is arranged so as to be assigned with the information relating to the storing position and storing method of data to be actually referenced by the lower hierarchical data reference atom (data reference).

The sample table atom (sample table) is assigned with information regarding each sample, and the type name thereof is set to "stbl". The sample table atom (sample table) comprises a sample description atom (sample description), a time sample atom (time-to-sample), a sample size atom (sample size), a sample chunk atom (sample-to-chunk), a chunk offset atom (chunk offset), a synchronous sample atom (sync sample), a composition time sample atom (composition time-to-sample), and so forth.

Here, with the time sample atom (time-to-sample), the relation between each sample and time axis according to decoding is described with a frame rate. With the sample size atom (sample size), the data volume of each sample is described. With the sample chunk atom (sample-to-chunk), the relation between a chunk and the sample making up the chunk is described. Note that here, a chunk is each block at the time of classifying each track data into blocks and assigning these to the media data atom, and a group of multiple samples makes up one chunk. With the chunk offset atom (chunk offset), the headmost position information of each chunk on the basis of a file head is recorded by an entry.

Figures 4, 5:
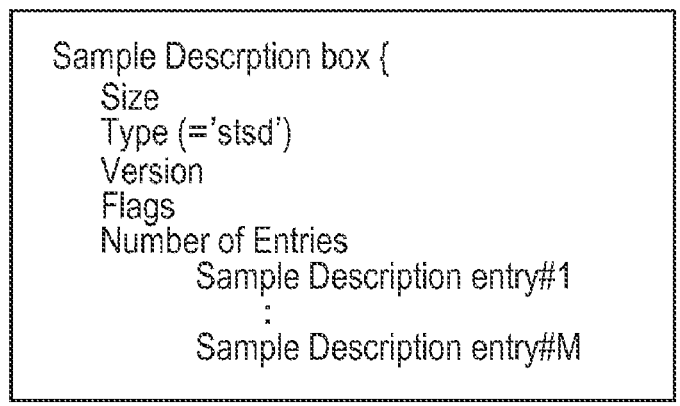
FIG. 4 is a chart serving for describing a sample description atom.
FIG. 5 is a chart serving for describing a sample description entry.

On the other hand, with the sample description atom (sample description), information relating to decoding is stored, and specifically, a data compression method and relevant information is assigned thereto. That is to say, as shown in FIG. 4, with the sample description atom (sample description), the size, type name (stsd), version, and flags thereof are sequentially assigned thereto. Also, the number of entries (number of Entries) of this sample description atom (sample description) is assigned thereto, and entries according to a data compression method and relevant information (sample description entry) are assigned thereto by as many entries.

With the sample description atom (sample description), these entries (sample description entry) are registered thereto in response to modification of the processing of actual data according to this entry (sample description entry), and the number of entries (number of Entries) is counted up. With the sample description atom (sample description), as for the track corresponding to video data, a field (Frame Count) for describing the number of frames to be assigned to one of this entries (sample description entry), one sample, and so forth are provided.

On the other hand, in the event of the program stream, the entry (sample description entry) according to the sample description atom (sample description) is formed in an extended manner, as shown in FIG. 5 and FIG. 6. Note that FIG. 6 is an example of the entry corresponding to the program stream made up of two sound streams and one video stream.

With this entry, the size (Size) of this entry, the corresponding data format (Data Format) of actual data, and a reference index number (Data Reference Index) are provided, following which a format atom (Format Atom) and a stream description atom (Stream Description Atom) are sequentially provided. Here, with the data format (Data Format), identification data indicating the type of corresponding actual data is provided, and with this embodiment, an arrangement is made wherein P2ST is assigned to the data format, which indicates that the corresponding actual data is the program stream conforming to the MPEG-2 system.

On the other hand, the format atom (Format Atom) and the stream description atom (Stream Descriptor Atom) are, as shown in FIG. 6, provided corresponding to the program stream, and the elementary streams making up this program stream, and only in the event of the program stream, two pairs of the format atom (Format Atom) and stream description atom (Stream Descriptor Atom) are provided. With the format atoms (Format Atom), an identifier specifying actual data according to this correspondence relation is assigned thereto, and specifically the identifier corresponding to the program stream, video stream, or sound stream is set to P2SI, vide, or soun, respectively.

With the stream description atom (Stream Descriptor Atom), information relating to the corresponding streaming is assigned thereto, and as for the stream description atom (Stream Descriptor Atom) according to the program stream, an arrangement is made wherein the system information is assigned to the headmost side, and the system auxiliary information is assigned to the subsequent side. Note that as for the stream description atoms (Stream Description Atom) of the video stream and sound stream, an arrangement is made wherein information relating to the entries (sample description entry) of the sample description atoms (sample description) according to a video track and sound track are assigned thereto respectively, and thus information necessary for reproducing the video stream and the sound stream are stored thereto respectively.

Here, as for the system information, of the information necessary for reproduction, such as the information included in the header of the program stream, and the information necessary for seamless reproduction of the sound stream, basic information is assigned thereto. As for the system auxiliary information, auxiliary information is assigned thereto, such as information effective when editing a stream, and information for selecting an object stream to be reproduced at equipment of which the function according to reproduction is restricted. With this embodiment, an arrangement is made wherein these information are separately assigned to two stream description atoms (Stream Descriptor Atom), thereby simplifying management according to these information, and simplifying processing when performing reproduction.

Specifically, the stream description atom (Stream Descriptor Atom) to which the system information is assigned is arranged as shown in FIG. 7, and stores the attribute information of the program stream. That is to say, in this case, with the stream description atom (Stream Descriptor Atom), the size (Size), and type (Type) using the type name "strd" are provided, and the version (Version), various types of flags (Flags), data format (Data Format (P2SI in this case)), video stream flags (Video Stream Status Flags), and number of streams (Number of Streams) are sequentially assigned thereto, and the stream information (Stream Information) is provided corresponding to the number of streams (Number of Streams).

Of these information, the video stream flags (Video Stream Status Flags) are arranged so as to store information indicating the status of a video stream, and as shown in FIG. 8, indicate regarding whether or not the video stream is made up of closed GOP alone by the headmost one bit thereof. On the other hand, the stream information, as shown in FIG. 9, is arranged so as to store the identifier of each stream within the program stream in the stream identifier (Stream Identifier) thereof, and indicate the priority when reproducing the corresponding stream by the subsequent stream property thereof.

According to the above arrangements, with this embodiment, the program stream conforming to the MPEG-2 system is arranged to be recorded with the QT format. Also, even if the program stream is thus recorded, an arrangement is made wherein the priorities when performing reproduction are set between the respective elementary streams making up the program streams, whereby each stream can be reproduced depending on the content of a file even with equipment of which the function is restricted.

With a QT file, corresponding to the setting of the priority in this sample description atom, a track property atom (track property Atom) shown in FIG. 10 is provided in the user data atoms according to the tracks other than the program stream. Here, with the track property atom (track property Atom), an arrangement is made wherein a size (Size), type (Type) using the type name (tkpt), version (Version), various types of flags (Flags), and so forth are provided, and setting of one priority of these information can show the priorities between the respective tracks when performing reproduction.

FIG. 11 is a chart showing a priority example between the sample description atoms according to the program stream and user data atoms. With this example, an arrangement is made wherein a program stream comprises one video stream and two sound streams, the priorities of a value of 1, value of 2, and value of 20 are set to the video stream, sound stream according to audio, and sound stream according to sound effects respectively by the stream properties of the sample description atoms according to the program stream. Also, an arrangement is made wherein two sound tracks are formed separately from this program stream, the priorities 10 and 3 are set to first and second background music (BGM) in the user data atoms of the track atoms according to these two sound tracks respectively.

Figure 12:
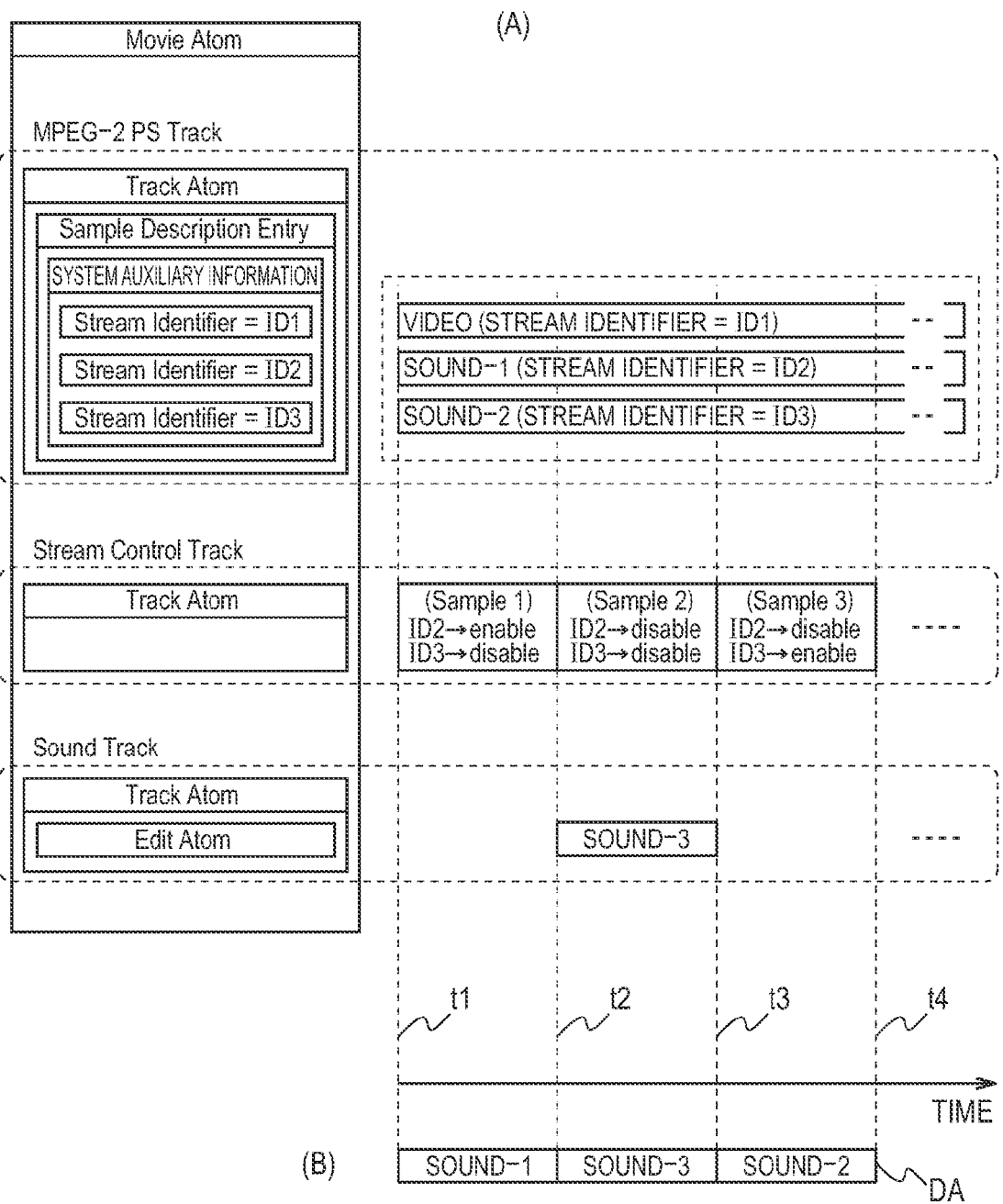
FIG. 12 is a diagram illustrating a stream control track.

Further, with this embodiment, a stream control track (Stream Control Track) is arranged so as to be provided in a media data atom in the movie atom, as shown in FIG. 12. Here, with the stream control track (Stream Control Track), control information according to reproduction is assigned to the respective streams within the program stream, and with this embodiment, information indicating enabling or disabling of reproduction is provided in this control information. Thus, a stream control track is generally not provided in an original state, but provided by editing. Note that with the movie atom, a track atom is provided corresponding to this stream control track (Stream Control Track), and as with the other track atoms, it is needless to say that correspondence between each sample and the program stream is realized by the duration according to the sample table atom provided in this track atom.

FIG. 13 is a chart showing sample data of the stream control track (Stream Control Track). The sample data of the stream control track (Stream Control Track) comprises one or multiple stream control elements (Stream Control Element), and each stream control element (Stream Control Element) comprises a size (Size), a control command (Control Command), a stream identifier (Stream Identifier), and control data (Control Data), as shown in FIG. 14.

Here, with the size (Size), the data size of this stream control element (Stream Control Element) is shown with the number of bytes.

With the control command (Control Command), information instructing the specific control of streaming is assigned thereto, and with this embodiment, as shown in FIG. 15, an arrangement is made wherein in the event that the control command (Control Command) is a value of 1, the control of streaming is set to show regarding whether or not the corresponding stream can be reproduced.

Also, the stream identifier (Stream Identifier) is arranged so as to identify streaming to be controlled by this control command. In the event that the control command (Control Command) is a value of 1, as shown in FIG. 16, the control data (Control Data) is arranged so as to instruct the corresponding streaming to be disabled or enabled depending on whether the value thereof is a value of 0 or 1 respectively.

According to the above arrangements, with the example shown in FIG. 12, an arrangement is made wherein the stream identifiers (Stream Identifier) are set to ID1, ID2, and ID3 corresponding to the video stream and the two sound streams in the program stream respectively, specifying the sound-1 and -2 streams to instruct these to be enabled and disabled respectively by the stream control element (Stream Control Element) of the headmost sample (Sample 1) of the stream control track instructs output of the sound-1 alone during point-in-time t1 through t2 corresponding to this headmost sample (Sample 1). Also, an arrangement is made wherein specifying the sound-1 and -2 streams to instruct both to be disabled by the stream control element (Stream Control Element) of the subsequent sample (Sample 2) suspends output of both the sound-1 and sound-2, and instruct another track to output a sound track during point-in-time t2 trough t3 corresponding to this sample (Sample 2).

Note that FIG. 17 and FIG. 18 are the descriptions of the stream control track corresponding to the headmost sample (Sample 1) and the subsequent sample (Sample 2) respectively.

With this embodiment, such descriptions facilitate the detailed control of the respective elementary streams making up the program stream even without definitions using track atoms.

(1-3) Processing of QT File

In accordance with the settings of these respective atoms according to a QT file, this videodisc device 1 is arranged so as to create a program stream conforming to the MPEG-2 using one video stream serving as imaging result, and one sound stream serving as stereo, and record this in the optical disc 2 as a QT file.

According to this arrangement, the system control microcomputer 19 controls the entire operation so as to record a media data atom in the optical disc 2 by the program stream conforming to the MPEG-2, also forms a track atom serving as the program stream by setting the system information and so forth in a sample description atom using the data according to the program stream acquired by the file generator 15 at the time of recording the media data atom, and controls the entire operation so as to record this track atom serving as a movie atom in the optical disc 2.

More specifically, the system control microcomputer 19 assigns the program stream to one track of the media data atom, sets information necessary for reproducing this program stream, and information necessary for reproducing the respective elementary streams making up this program stream in the sample description atom of the track atom serving as a management information block corresponding to this track, and thus sets the program stream processable as with other actual data serving as a track to form a QT file using the program stream, and records this QT file in the optical disc 2. According to this arrangement, this videodisc device 1 is arranged so as to record a program stream conforming to the MPEG-2 system in the optical disc 2 as a QT file.

With the processing for thus creating the sample description atom of the movie atom, the system control microcomputer 19 sets a value of 1 and value of 2 to the video stream and sound stream respectively as the priorities of the video stream and sound stream, and thus sets the priorities when performing reproduction in accordance with the order of the video stream and sound stream.

Also, the system control microcomputer 19 sequentially subjects the video data to encoding processing using closed GOP, and sets the video stream status flags of the system auxiliary information to the flag corresponding to closed GOP.

Also, the system control microcomputer 19 creates a QT file so as not to include a stream control track.

On the other hand, in the event that reproduction of the QT file recorded in this optical disc 2 is instructed by the user, the system control microcomputer 19 instructs the respective units to reproduce the movie atom according to the corresponding QT file, and acquires data such as the track atom by this reproduction of the movie atom. The system control microcomputer 19 determines whether or not the QT file according to this reproduction includes the other elementary streams other than the program stream conforming to the MPEG-2 system based on the setting of the movie atom, and in the event of including the other elementary stream, the system control microcomputer 19 informs the user that the QT file is a hard-to-reproduce file. Note that in this case, such a hard-to-reproduce file may be hidden from the user, or may be prevented from selection by the user.

Also, in the event of not including the other elementary stream, the system control microcomputer 19 determines whether or not the program stream includes many more streams than one video stream and one sound stream based on the sample description atom, and in the event of including many more streams, the system control microcomputer 19 also informs the user that the QT file is a hard-to-reproduce file, regarding this file as well. Note that in this case as well, such a hard-to-reproduce file may be hidden from the user, or may be prevented from selection by the user.

Also, in the event that the file selected by the user is a program stream file made up of one video stream and one sound stream, the system control microcomputer 19 determines whether or not the video stream is made up of closed GOP based on the video stream status flags of the system auxiliary information, and in the event that the flags do not show that the video stream is made up of closed GOP alone, the system control microcomputer 19 informs the user that the file is a hard-to-reproduce file. Note that in this case as well, such a hard-to-reproduce file may be hidden from the user, or may be prevented from selection by the user.

In this case, the system control microcomputer 19 can determine whether or not the file can be reproduced by reproducing the resource side without reproducing the sequence header and the like set in the actual data according to the program stream, and accordingly, user interface can be improved accordingly.

As a result of these determinations, in the event that the file of which reproduction is instructed by the user, as with the original QT file according to when recording, is made up of one video stream and one sound stream, and also made up of closed GOP, the system control microcomputer 19 instructs reproduction of the media data atom based on recording of this movie atom, and thus sequentially reproduces the program stream conforming to the MPEG-2 system, and provides this to the user.

(2) Operation of the First Embodiment

According to the above arrangements, with this videodisc device 1, the video signal DV1 acquired by the imaging means is subjected to encoding processing by the video encoder 11 to form a video stream, the video stream is input to the file generator 15, similarly the sound signal DA1 acquired by a microphone or the like is subjected to encoding processing by the audio encoder 12 to form a sound stream, the sound stream is input to the file generator 15, where a program stream conforming to the MPEG-2 system is generated. Also, this program stream is converted into the media data atom of a QT file, and is recorded in the optical disc 2 by the subsequent series of arrangements.

With the processing at this file generator 15, the program stream is retained in the memory 15A following various types of information necessary for reproduction being acquired, recording of the program stream ends by the end-of-filming instruction by the user, the data sequence of the movie atom is sequentially generated by the file generator 15 based on the information retained in the memory 15A, and the data sequence of this movie atom is recorded in the optical disc 2. According to this arrangement, with this videodisc device 1, the program stream in which the vide stream and sound stream are mixed is recorded in the optical disc 2 as a QT file.

With this QT file, such as shown in that the track atom corresponding to this program stream indicates that the program stream conforming to the MPEG-2 system is actual data, the track header and the like are set, and also the respective atoms of the sample table atom are set so as to correspond to the sample and so forth of the media data atom according to this program stream.

At this time, based on the settings of these respective atoms of the sample table atom, with this QT file, information necessary for reproducing the program stream, and information necessary for reproducing each elementary stream making up the program stream are set by expansion of the sample description atom, and thus this QT file serving as a resource is set so as to be distinguishable even with other equipment, and further is set so as to be distinguishable as to the actual data according to the other track, the QT file made up of the program stream of the MPEG-2 system is recorded, and thus the QT file made up of the program stream of the MPEG-2 system can be recorded while maintaining the compatibility as to the conventional format.

Thus, the information necessary for reproducing the program stream, and the information necessary for reproducing each elementary stream making up the program stream are set on the resource side, whereby determination can be made with this QT file regarding whether or not the file is reproducible only by reproducing the movie atom without reproducing and viewing the program stream, whereby user interface can be improved markedly.

According to the above arrangement, conventional equipment which does not easily correspond to the settings according to this track atom can determine that this QT file made up of the program stream is a hard-to-reproduce file, also equipment which can reproduce the QT file made up of the program stream can determine whether or not the file is a hard-to-reproduce file in further detail, whereby the program stream of the MPEG-2 system can be recorded in the optical disc 2 while maintaining the compatibility as to various types of equipment.

Also, of such reproducible information, the information according to the program stream is separated into basic information and auxiliary information, and assigned to sample description atoms, whereby determination can be made regarding whether or not reproduction can be performed by confirming only any piece of the information as necessary, also whereby user interface can be improved markedly. That is to say, in the event of simply reproducing the program stream, reproduction can be performed based on the basic information serving as the system information, and further in the event of editing processing or the like, reproduction can be processed with reference to the auxiliary information, whereby the processing when performing reproduction can be simplified.

Also, determination can be made regarding whether or not reproduction can be performed only by reproducing the movie atom without reproducing and viewing the program stream also by setting information regarding whether or not the program stream is a stream according to closed GOP to this sample description atom whereby user interface can be improved markedly.

Subsequently, in the event that reproduction of the QT file thus recorded is instructed by the user, with the videodisc device 1, the optical disc 2 reproduces the movie atom of this file, determination is made regarding whether or not reproduction can be performed according to the settings of this movie atom, and in the event of reproducible, the media data atoms are sequentially reproduced, and the video stream and sound stream are decoded by the processing of the file decoder 16 in accordance with the settings of the movie atom, and provided to the user.

(3) Advantages of the First Embodiment

According to the above arrangements, the information necessary for reproducing the program stream, and the information necessary for reproducing the streams making up this program stream are set to one track atom, and this program stream is assigned to the track corresponding to this track atom, whereby the program stream of the MPEG-2 system can be recorded in the optical disc 2 using the QT file.

Also, at this time, information necessary for reproducing the respective elementary streams making up the program stream is set as the expanded data of the sample description atom serving as a management information block for defining information necessary for reproducing the track, whereby the QT file made up of the program stream of the MPEG-2 system can be recorded while maintaining the compatibility as to the conventional format.

Also, this information necessary for reproduction is separated into the basic information and auxiliary information and set, whereby the processing when performing reproduction and so forth can be simplified.

Also, even by setting information regarding whether or not the program stream is a stream according to closed GOP to this sample description atom, also the program stream of the MPEG-2 system is arranged so as to be recorded in the optical disc 2 using the QT file, whereby determination can be made regarding whether or not reproduction can be performed only by reproducing the movie atom without reproducing and viewing the program stream, thereby markedly improving user interface.

(4) Second Embodiment

With this embodiment, the priorities of the respective element streams of the program stream above described regarding FIG. 9 and the priorities of the respective tracks above described regarding FIG. 10 are effectively used to reproduce these tracks depending on the content of a file appropriately. Note that the QT file according to this embodiment is created in accordance with the settings above described regarding the First Embodiment.

Accordingly, with this embodiment, the QT file recorded by the videodisc device 1 according to the First Embodiment is subjected to editing processing by an editing device, and thus as shown in FIG. 11, a sound stream serving as sound effects is appended to the video and sound streams serving as imaging results to form a program stream, and a QT file is created with this program stream, and the two sound tracks serving as background music.

In this case, with the editing device, for example, while reproducing the QT file according to the imaging results recorded in the optical disc 2 using generally the same recording and reproducing system as that of the videodisc device 1 above described regarding FIG. 1, a program stream is created with the sound stream serving as sound effects input from another source, and the vide stream and sound stream reproduced from the QT file, and is temporarily recorded in the optical disc 2 or another recording medium, and retained. Also, a QT file is created with this program stream and the two sound streams serving as background music.

When thus creating a QT file with the program stream and the two sound streams serving as background music, the editing device sets the priorities shown in FIG. 11 in accordance with the settings by the user.

Figure 19:
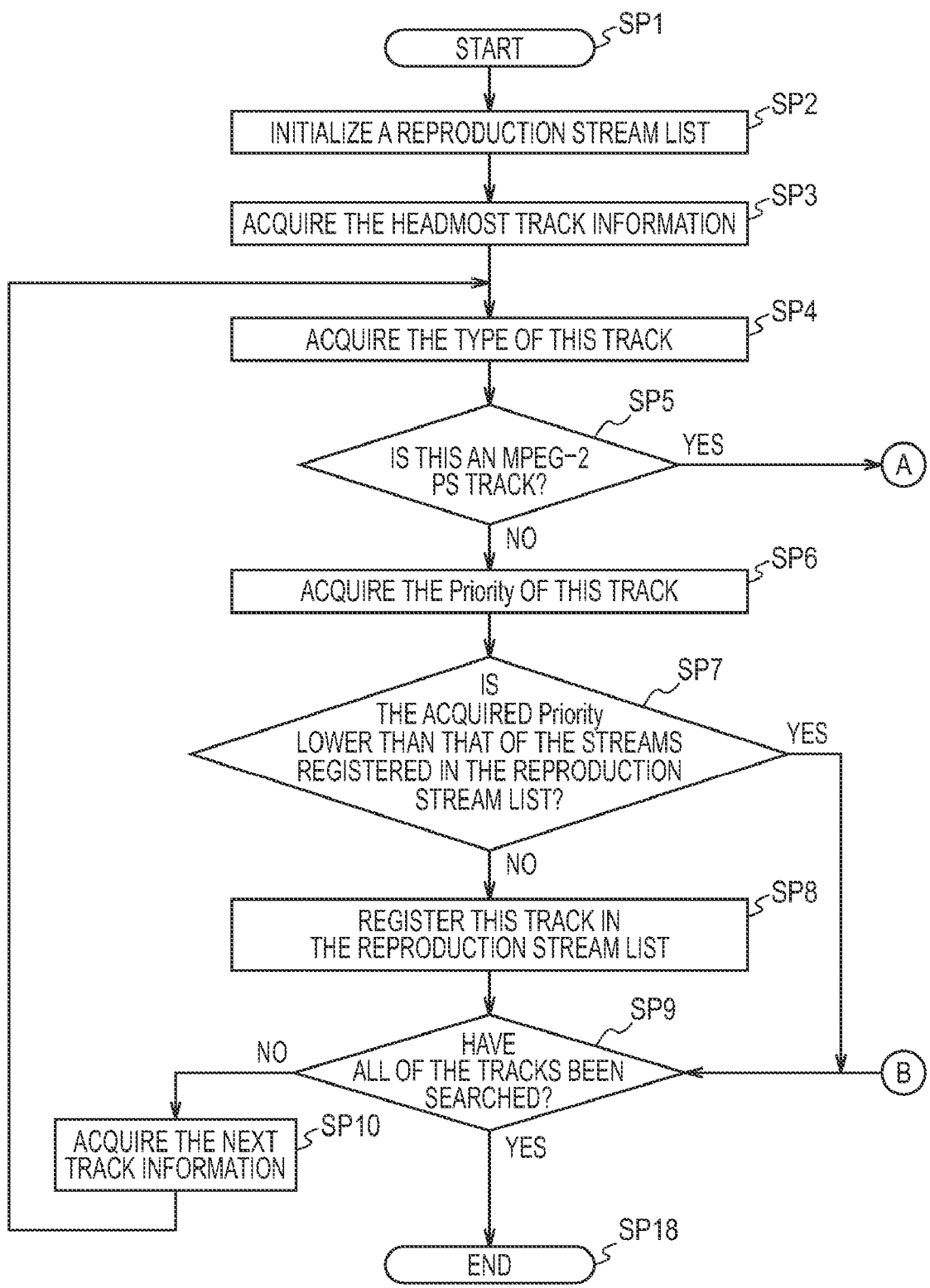
FIG. 19 is a flowchart illustrating the reproducing processing procedure of sound tracks in accordance with the priorities set in a QT file.
Figure 20:
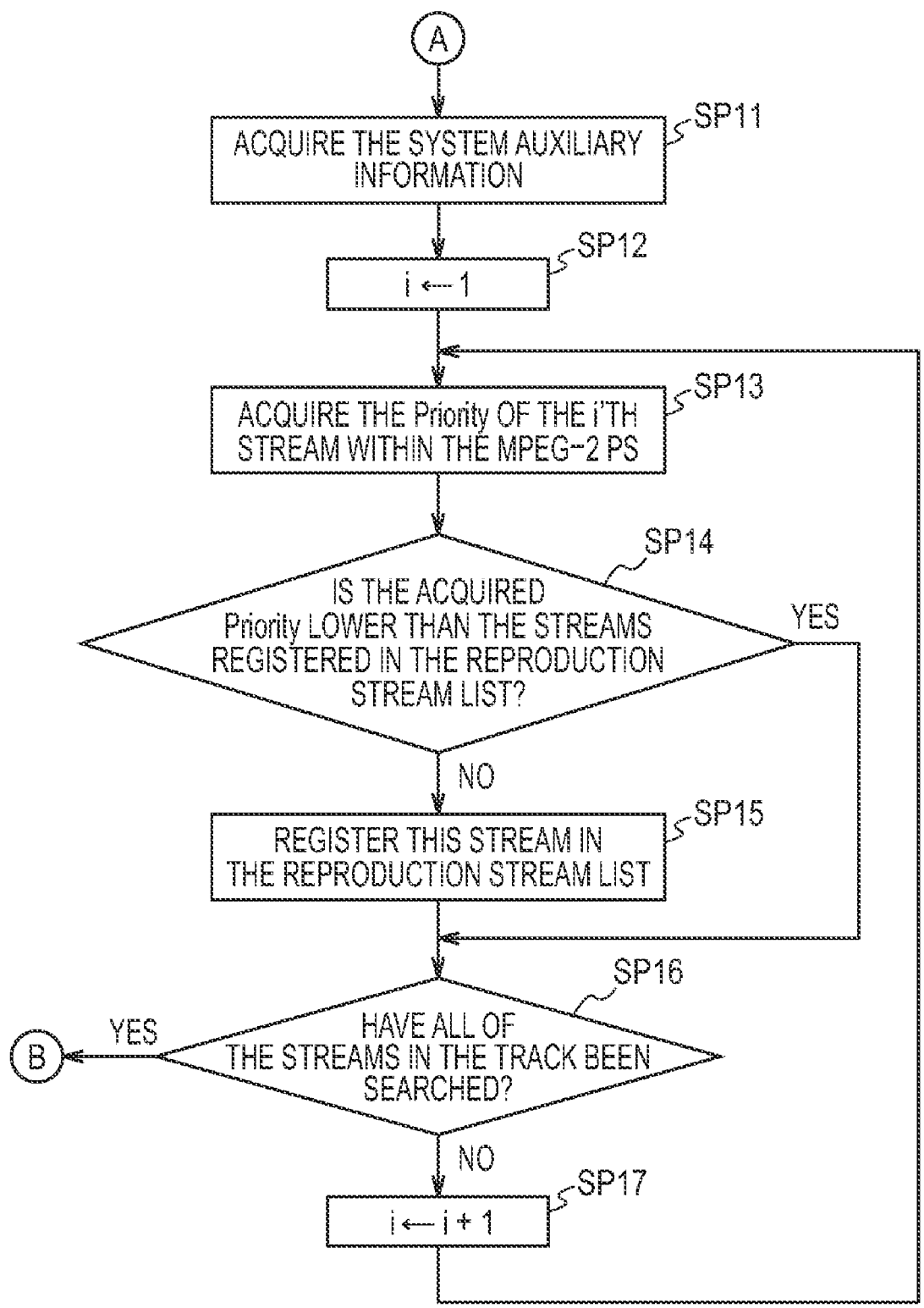
FIG. 20 is a flowchart illustrating a continuation of FIG. 19.

On the other hand, a reproducing device according to this embodiment is equipment which does not easily reproduce all of the four sound streams made up of two sound streams according to such a programs stream, and two sound streams using as another track, and is limited in resources, and accordingly, performs reproduction by selecting a sound track within a reproducible range in accordance with the priorities set in the QT file by the processing procedure in FIG. 19 and FIG. 20.

Note that this reproducing device has generally the same recording and reproducing system as the videodisc device above described regarding FIG. 1 except that the file decoder 16, audio decoder 14, and so forth are arranged so as to process multiple sound streams corresponding to the reproducing device according to this embodiment, so that hereinafter, description will be made with reference to the configuration in this FIG. 1.

That is to say, with this reproducing device, upon reproduction of a QT file being instructed by a user, the system control microcomputer 19 proceeds to step SP2 from step SP1, and initializes a reproduction stream list in which streams to be reproduced are registered. Note that now, the reproduction stream list is arranged so as to register the streams to be reproduced by the number which can be reproduced by the resource of this reproducing device. Subsequently, the system control microcomputer 19 proceeds to step SP3, instructs reproduction of the movie atom of the QT file of which reproduction is instructed, and acquires the information of the headmost track atom set in this movie atom. Subsequently, the system control microcomputer 19, in step SP4, determines the type of the track based on the information of the headmost track atom acquired in step SP3, and subsequently in step SP5, determines whether or not this track is the track atom of a program stream conforming to the MPEG-2 system.

Upon a negative result being obtained, this case means that this track atom is the track atom of the sound stream of another track, the system control microcomputer 19 proceeds to step SP6 from step SP5, and acquires the priority information set in the user data atom of this track atom. Also, in the subsequent step SP7, the system control microcomputer 19 determines whether or not a reproducible number of streams have been registered in the reproduction stream list, and also the priority of this acquired information is further lower than the lowest priority of the streams which have been registered in the reproduction stream list.

Here, in the event that a reproducible number of streams have not been registered in the reproduction stream list yet, or in the event that a reproducible number of streams have been already registered in the reproduction stream list, and also the priority of this acquired information is higher than the lowest priority of the streams which have been registered in the reproduction stream list, the system control microcomputer 19 proceeds to step SP8 from step SP7, and registers the track corresponding to the track atom according to this information acquisition into the reproduction stream list as an object to be reproduced. Also, in this case, in the event that a reproducible number of streams have been already registered in the reproduction stream list, of the streams registered, the system control microcomputer 19 excludes the stream having the lowest priority from the objects to be reproduced, and registers the track corresponding to the track atom according to this information acquisition into the reproduction stream list. When the system control microcomputer 19 thus completes registration to the reproduction list, the system control microcomputer 19 proceeds to step SP9.

On the other hand, in the event that a reproducible number of streams has been already registered in the reproduction stream list, and also the priority of this acquired information is further lower than the lowest priority of the streams which have been registered in the reproduction stream list, the system control microcomputer 19 directly proceeds to step SP9 from step SP7 without registering the track corresponding to the track atom according to this information acquisition into the reproduction stream list.

In this step SP9, the system control microcomputer 19 determines whether or not the processing regarding all of the track atoms set in the movie atom has been completed, and in the event of obtaining a negative result, the system control microcomputer 19 proceeds to step SP10 from step SP9, switches an object to be processed to the next track atom, and returns to step SP4.

According to the above arrangement, with regard to the sound track assigned to a QT file as another track, the system control microcomputer 19 is arranged so as to select an object to be reproduced based on the priority of the user data atom provided in the track atom corresponding to this sound track.

On the other hand, in the event that the track atom is the track atom of the program stream conforming to the MPEG-2 system, the system control microcomputer 19 obtains a positive result in step SP5, and accordingly proceeds to step SP11 from step SP5. Here, the system control microcomputer 19 acquires the system auxiliary information provided in the sample description of this track atom. Also, in the subsequent step SP12, the system control microcomputer 19 initializes a variable i which is used for priority processing to a value of 1, and in the subsequent step SP13, with regard to the elementary stream which makes up this program stream and is specified by this variable i, the system control microcomputer 19 detects priority information using the system auxiliary information acquired in step SP11.

Also, in the subsequent step SP14, the system control microcomputer 19 determines whether or not a reproducible number of streams has been registered in the reproduction stream list, and also the priority of this acquired information is further lower than the lowest priority of the streams which have been registered in the reproduction stream list.

Here, in the event that a reproducible number of streams have not been registered in the reproduction stream list yet, or in the event that a reproducible number of streams have been already registered in the reproduction stream list, and also the priority of this acquired information is higher than the lowest priority of the streams which have been registered in the reproduction stream list, the system control microcomputer 19 proceeds to step SP15 from step SP14, and registers the elementary stream according to this information acquisition into the reproduction stream list as an object to be reproduced. Also, in this case, in the event that a reproducible number of streams have been already registered in the reproduction stream list, of the streams registered, the system control microcomputer 19 excludes the stream having the lowest priority from the objects to be reproduced, and registers the elementary stream according to this information acquisition into the reproduction stream list. When the system control microcomputer 19 thus completes registration to the reproduction stream list, the system control microcomputer 19 proceeds to step SP16.

On the other hand, in the event that a reproducible number of streams has been already registered in the reproduction stream list, and also the priority of this acquired information is further lower than the lowest priority of the streams which have been registered in the reproduction stream list, the system control microcomputer 19 directly proceeds to step SP16 from step SP14 without registering into the reproduction track list.

In this step SP16, the system control microcomputer 19 determines whether or not the processing regarding all of the elementary streams has been completed, and in the event of obtaining a negative result, the system control microcomputer 19 proceeds to step SP17 from step SP16, increments the variable i, and returns to step SP13. Thus, the system control microcomputer 19, with regard to the respective elementary streams making up the program stream, sequentially detects the respective priorities set in the sample description atoms to set the elementary stream to an object to be reproduced, upon the processing regarding all of the respective elementary streams making up the program stream having been completed, obtains a positive result in step SP16, and accordingly proceeds to step SP9 from the step SP16.

Also, upon the processing regarding all of the tracks in this QT file having been completed, the system control microcomputer 19 can obtain a positive result in step SP9, and accordingly proceeds to step SP18 from step SP9, and ends this processing procedure.

According to these processing, the system control microcomputer 19 registers an object to be reproduced into the reproduction stream list in a reproducible range in accordance with the priorities set in the movie atom. Also, the system control microcomputer 19 reproduces only the corresponding track in accordance with this reproduction stream list, and provides this to the user.

According to this embodiment, an arrangement is made wherein a program stream is recorded as a QT file, and the priorities when performing reproduction are set to the respective elementary streams making up this program stream, whereby the program stream can be appropriately reproduced depending on the content of the file.

Also, with regard to other tracks as well, even in the event of creating a QT file by mixing a track serving a program stream and other tracks, the respective streams can be appropriately reproduced depending on the content of the file by setting priorities thereto.

Also, on the reproducing side, the respective streams can be appropriately reproduced depending on the content of the file by selecting an object to be reproduced in accordance with the settings of the priorities thus set.

(5) Third Embodiment

With this embodiment, sound tracks are subjected to mixing and output in accordance with the priorities above described regarding the Second Embodiment, and thus the priorities set to the QT file are effectively used, and these tracks are appropriately reproduced depending on the content of the file. Note that the QT file according to this embodiment is formed identically to the QT file according to the Second Embodiment, so that redundant description will be omitted.

A reproducing device according to this embodiment has generally the same recording and reproducing system as the videodisc device 1 above described regarding FIG. 1 except that there are sufficient resources as to the QT file of which reproduction is instructed, and specifically, except that the file decoder 16, audio decoder 14, and so forth are arranged so as to process multiple sound streams corresponding to the reproducing device according to this embodiment, so that hereinafter, description will be made with reference to the configuration in this FIG. 1.

Figure 21:
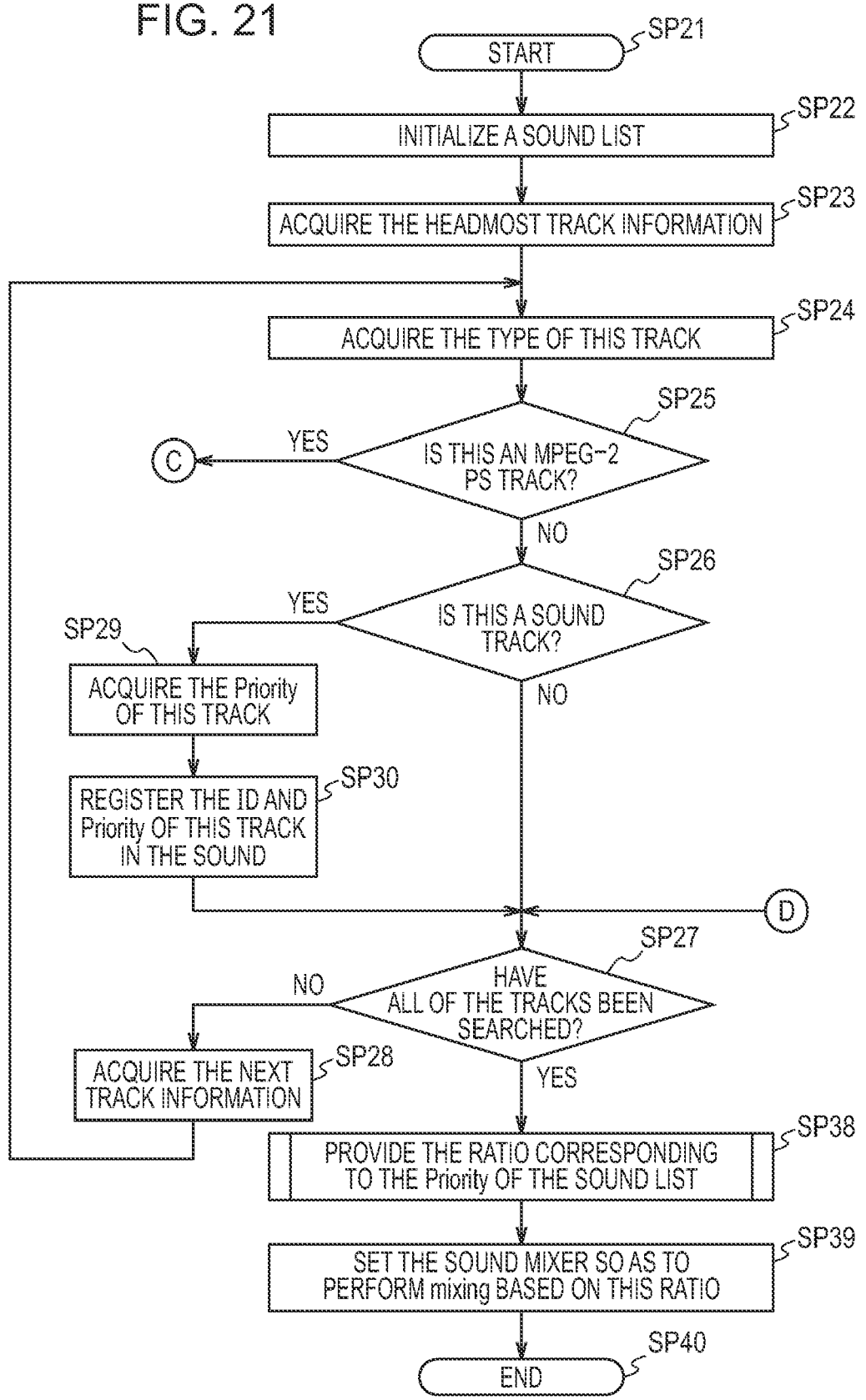
FIG. 21 is a flowchart illustrating the mixing processing procedure in accordance with the priorities set in a QT file.
Figure 22:
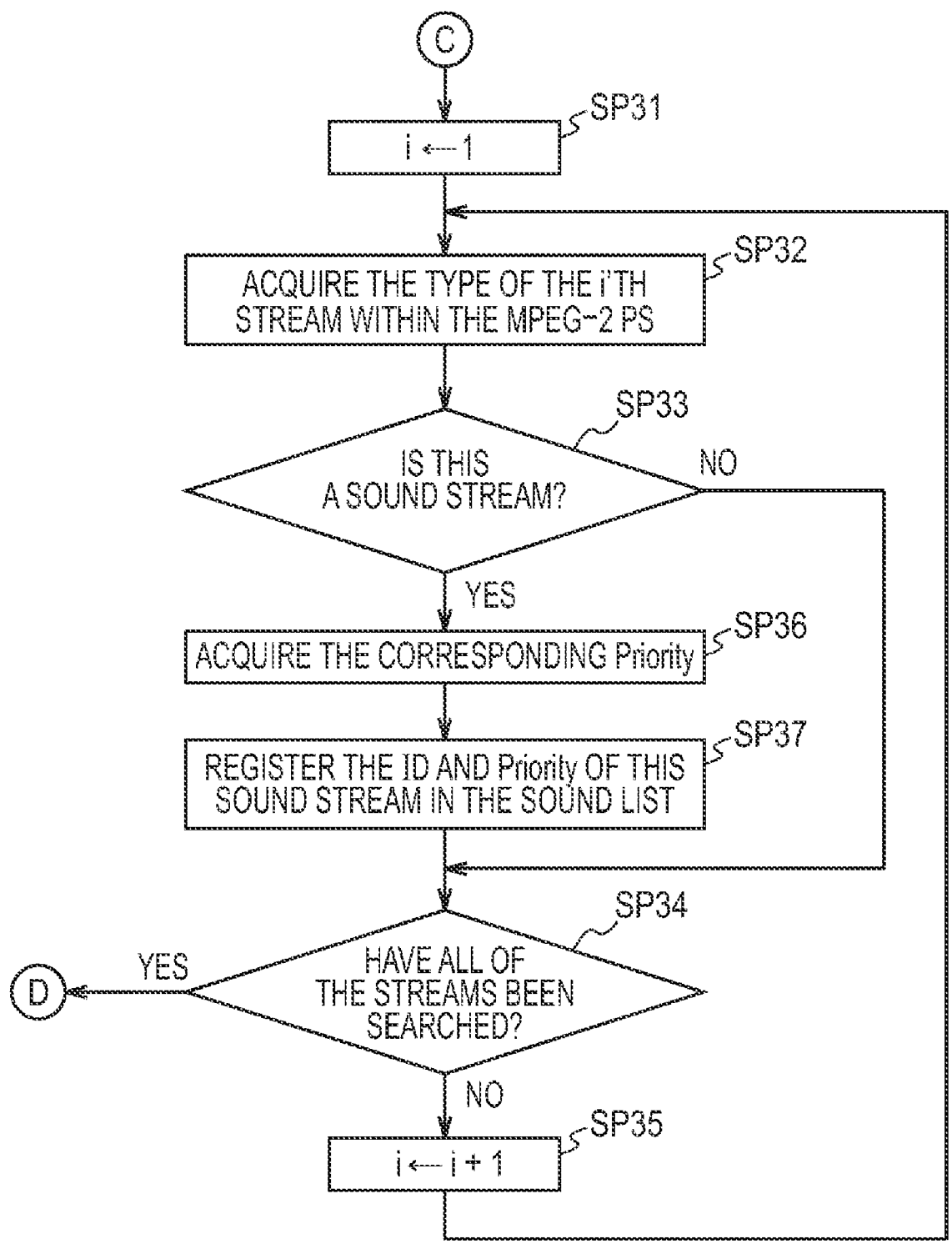
FIG. 22 is a flowchart illustrating a continuation of FIG. 21.

The system control microcomputer 19 of this reproducing device detects the priorities information regarding the respective streams of the QT file to set mixing ratios thereof by executing the processing procedure in FIG. 21 and FIG. 22. That is to say, the system control microcomputer 19, upon reproduction of the QT file being instructed by a user, proceeds to step SP22 from step SP21, and initializes a sound list. Here, the sound list is a list which records the identifier of a sound track along with the priority thereof. Subsequently, the system control microcomputer 19 proceeds to step SP23, instructs reproduction of the movie atom of the QT file of which reproduction is instructed, and acquires the information of the headmost track atom set in this movie atom. Subsequently, the system control microcomputer 19, in step SP24, determines the type of the track based on the information of the headmost track atom acquired in step SP23, and in the subsequent step SP25, determines whether or not this track is the track atom of a program stream conforming to the MPEG-2 system.

Upon a negative result being obtained here, this case means that this track atom is the track atom of a sound stream or the like of another track, the system control microcomputer 19 proceeds to step SP26 from step SP25, and determines whether or not this track is a sound track. Here, in the event that this track is a video track, the system control microcomputer 19 obtains a negative result, and proceeds to step SP27 from step SP26, determines whether or not the processing regarding all of the track atoms has been completed, and upon a negative result being obtained, the system control microcomputer 19 proceeds to step SP28 from step SP27, switches an object to be processed to the next track atom, and returns to step SP24.

On the other hand, upon a positive result being obtained in step SP26, the system control microcomputer 19 proceeds to step SP29 from step SP26, and acquires the priority information set to the user data atom of this track atom. Also, subsequently in step SP30, the system control microcomputer 19 registers this acquired priority information into the sound list along with the identifier of the corresponding track, and proceeds to step SP27.

Accordingly, in this case as well, the system control microcomputer 19 is arranged so as to acquire the priority information set in the user data atoms regarding sound tracks serving as another track, and register this acquired priority information into the sound list.

On the other hand, upon a positive result being obtained in step SP25, the system control microcomputer 19 proceeds to step SP31 from step SP25. Here, the system control microcomputer 19 initializes a variable i which is used for priority processing to a value of 1, and in the subsequent step SP32, with regard to the elementary stream which makes up this program stream and is specified by this variable i, acquires information indicating the type of the stream from the system information (format atom) of the sample description atom. Also, in the subsequent step SP33, the system control microcomputer 19 determines whether or not this acquired information is a sound stream, and upon a negative result being obtained here, proceeds to step SP34 from step SP33, determines whether or not the processing regarding all of the elementary streams of the program stream has been completed, and upon a negative result being obtained here, proceeds to step SP35 from step SP34, increments the variable i, and then returns to step SP32.

On the other hand, upon a positive result being obtained in step SP33, the system control microcomputer 19 proceeds to step SP36 from step SP33, acquires the priority information regarding this stream, following which in step SP37, registers this acquired priority into the sound list along with the identifier for specifying the sound stream, and proceeds to step SP34. Accordingly, in this case as well, with regard to the program stream, the system control microcomputer 19 sequentially acquires the priorities of the respective sound streams making up the program stream from the corresponding sample description atom, and upon the processing regarding all of the streams making up the program stream having been completed, obtains a positive result in step SP34, and accordingly proceeds to step SP27 from step SP34.

Also, upon this processing regarding all of the tracks making up the QT file having been completed, the system control microcomputer 19 can obtain a positive result in step SP27, and accordingly proceeds to step SP38 from step SP27. Here, the system control microcomputer 19 sets a mixing ratio to the respective sound tracks depending on the priorities registered in the sound list, and in the subsequent step SP39, instructs the audio decoder 14 to perform mixing with these ratios, following which proceeds to step SP40, and ends this processing procedure.

Figure 23:
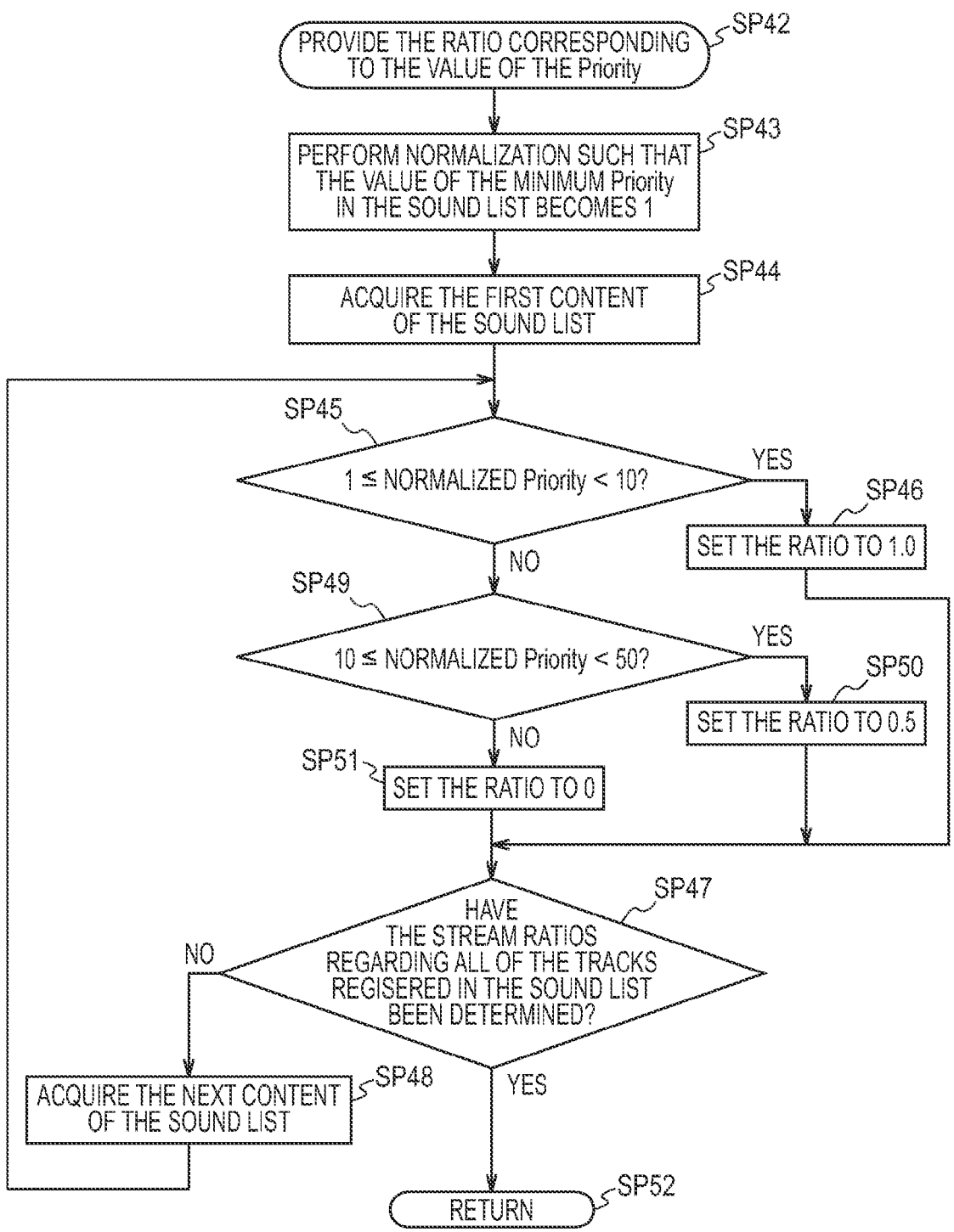
FIG. 23 is a flowchart illustrating the ratio setting processing procedure in the processing procedure in FIG. 21.

FIG. 23 is a flowchart illustrating the ratio setting processing procedure according to this step SP38. With this processing procedure, the system control microcomputer 19 proceeds to step SP43 from step SP42, divides the value of each priority by a predetermined value such that the lowest value of the priorities registered in the sound list becomes a value of 1 here, and thus normalizes the priority information.

Subsequently, the system control microcomputer 19 proceeds to step SP44, here acquires information according to the priority registered in the top of the sound list, and in the subsequent step SP45, determines whether or not the value of the acquired normalized priority is equal to or greater than a value of 1, or less than a value of 10. Upon a positive result being obtained here, the system control microcomputer 19 proceeds to step SP46 from step SP45, sets the ratio regarding this track to a value of 1.0, following which proceeds to step SP47, and determines whether or not the processing regarding all of the streams registered in the sound list has been completed. Upon a negative result being obtained here, the system control microcomputer 19 proceeds to step SP48, sets an object to be processed to the next content of the sound list, and then returns to step SP45.

On the other hand, upon a negative result being obtained in step SP45, the system control microcomputer 19 proceeds to step SP49 from step SP45. Here, the system control microcomputer 19 determines whether or not the value of the normalized priority is equal to or greater than a value of 10, or less than a value of 50. Upon a positive result being obtained here, the system control microcomputer 19 proceeds to step SP50 from step SP49, sets the ratio regarding this stream to a value of 0.5, following which proceeds to step SP47.

On the other hand, upon a negative result being obtained in step SP49, the system control microcomputer 19 proceeds to step SP51 from step SP49, sets the ratio regarding this stream to a value of 0, following which proceeds to step SP47.

Thus, the system control microcomputer 19 is arranged so as to set a ratio to each stream depending on the priority set to each stream. In the event that the priorities according to the settings in FIG. 11 are processed by this processing procedure, ratios are set to the respective streams as shown in FIG. 24 by contrast with FIG. 11.

The system control microcomputer 19 instructs the audio decoder 14 to perform processing of decoding results so as to subject the reproduction output of each streaming to weighting addition and output in accordance with the above corresponding ratio, and thus subjects each streaming to mixing and output in accordance with the priority thereof, and thus appropriately reproduces each stream depending on the content of the file.

With the conventional QT file, in the event of mixing and reproducing multiple sound streams, the respective streams are evenly handled. Accordingly, in the event of assigning strength to each track, it has been necessary to store actual data itself, which is stored in a track, of which sound volume is set variable beforehand, or separately provide a track for sound volume control.

However, such pre-processing according to a QT file can be omitted by setting mixing ratios depending on priorities like this embodiment.

According to this embodiment, the respective elementary streams of the program stream using a QT file are subjected to mixing and output based on the ratios in accordance with the priorities set to the respective elementary streams, whereby the program stream can be appropriately reproduced depending on the content of the QT file.

(6) Fourth Embodiment

With this embodiment, a reproducing device of a QT file processes each streaming in combination of the above Second Embodiment and Third Embodiment. That is to say, a streaming having high priority is selectively acquired in a reproducible range by registering streams into a reproduction streaming list in accordance with priorities, a ratio is set to this streaming having high priority based on the priorities, and the streaming is subjected to mixing and output in accordance with this ratio.

With this embodiment, video streams are also processed in the same way. Note that with this processing regarding video streams, various cases can be conceived regarding streams having a small ratio, such as the case of reducing the frame rate, the case of lowering resolution, and the case of lowering gradation according to color, as well as the case of output simply by mixing.

As with this embodiment, even if a stream is selected depending on priorities in a reproducible range, and this selected stream is subjected to mixing based on the ratio in accordance with the priorities, the program stream can be appropriately reproduced depending on the content of the file.

Also, applying this embodiment to a video stream enables the program stream to be suitably reproduced regarding the video stream depending on the content of the file.

(7) Fifth Embodiment

With this embodiment, the present invention is applied to an editing device which does not easily process the video stream subjected to encoding processing with open GOP, determination is made regarding whether or not a file to be processed is a file which can be edited based on the identification information indicating the GOP above described regarding FIG. 8, and in the event of a hard-to-edit file, editing instructions by the user are ignored, and the user is informed that the file is a hard-to-edit file.

Note that with the editing device according to this embodiment, the recording and reproducing system is configured in generally the same way as the videodisc device 1 above described regarding FIG. 1 except for the point according to the processing of such a file, so hereinafter, description will be made with reference to the configuration in this FIG. 1.

Figure 25:
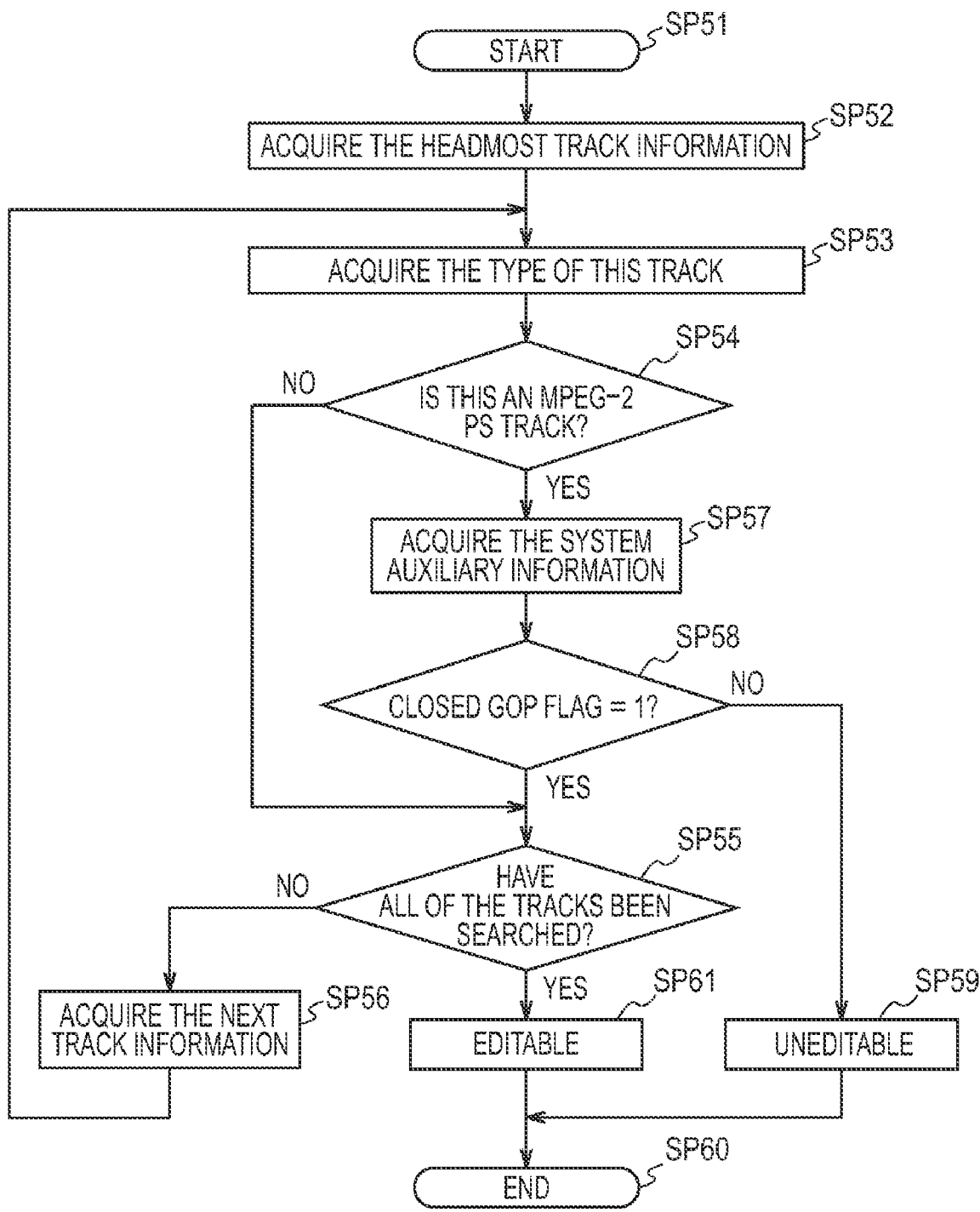
FIG. 25 is a flowchart illustrating the processing procedure relating to the identifier of closed GOP.

FIG. 25 is a flowchart illustrating the processing procedure of the system control microcomputer 19 according to this file. The system control microcomputer 19, upon a file to be edited being instructed by the user, starts this processing procedure, and proceeds to step SP52 from step SP51. Here, the system control microcomputer 19 instructs reproduction of the movie atom of a QT file instructed by the user, and acquires the information of the headmost track atom set in this movie atom. Subsequently, the system control microcomputer 19, in step SP53, determines the type of the track based on the information of the headmost track atom acquired in step SP52, and subsequently in step SP54, determines whether or not this track is the track atom of a program stream conforming to the MPEG-2 system.

Upon a negative result being obtained here, the system control microcomputer 19 proceeds to step SP55 from step SP54, determines whether or not the processing regarding all of the track atoms has been completed, and upon a negative result being obtained, the system control microcomputer 19 proceeds to step SP56 from step SP55, switches an object to be processed to the next track atom, and returns to step SP 53.

On the other hand, upon a positive result being obtained in step SP54, the system control microcomputer 19 proceeds to step SP57 from step SP54, and here acquires the system auxiliary information set in the sample description atom of this track atom. Also, in the subsequent step SP58, the system control microcomputer 19 determines whether or not the flags set in this system auxiliary information are set so as to indicate closed GOP, and upon a positive result being obtained here, proceeds to step SP55 from step SP58. Thus, the system control microcomputer 19 sequentially acquires the track atoms to detect the program stream of the MPEG-2, and in the event of the program stream of the MPEG-2, the system control microcomputer 19 determines whether or not the program stream is made up of closed GOP.

In the event that the video stream of the program stream of the MPEG-2 thus detected is open GOP, the system control microcomputer 19 can obtain a negative result in step SP58, and accordingly proceeds to step SP59, sets the QT file specified by the user edit-impossible, following which proceeds to step SP60 to end this processing procedure.

On the other hand, in the event of all of the track atoms having been detected and the program stream of the MPEG-2 having not been detected, or further in the event that the video stream in the program stream of the MPEG-2 is made up of closed GOP, the system control microcomputer 19 can obtain a positive result in step SP55, and accordingly proceeds to step SP61 from step SP55, sets the QT file specified by the user edit-possible, following which proceeds to step SP60 to end this processing procedure.

As with this embodiment, determination is made regarding whether or not the file is a file which can be processed based on the identification information set in the sample description atom which indicates whether to be closed GOP, and the program stream is recorded with the QT file, whereby determination can be made regarding whether or not the file can be processed without reproducing and analyzing the program stream, and user interface can be improved accordingly.

(8) Sixth Embodiment

Figure 26:
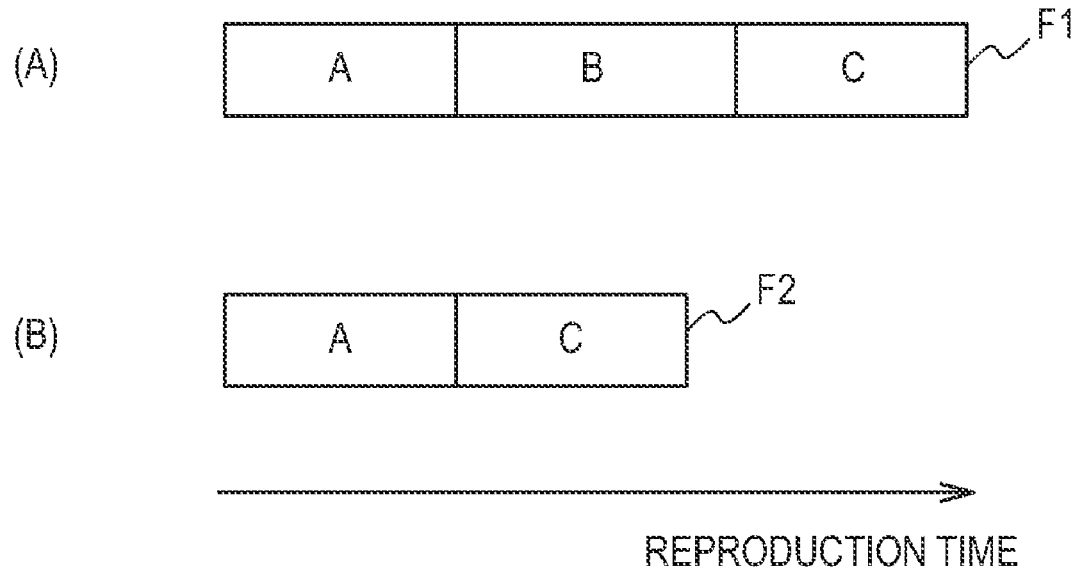
FIG. 26 is a schematic diagram serving for describing editing processing using an edit atom.

With this embodiment, the present invention is applied to a reproducing device of a QT file subjected to non-destructive editing processing by the settings of an edit atom. That is to say, with the QT file, for example as shown in FIG. 26, in the event that a program stream of the MPEG-2 (FIG. 26(A)) serving as an original is made up of continuous scenes of codes A, B, and C based on the settings of the edit atom, a resource file in which the edit atom is set again is created to set this original media data atom to external reference, whereby a QT file F2 which is set so as to be reproduced while skipping the scene B can be created as shown in FIG. 26(B) without any modification as to an original QT file F1.

Figure 27:
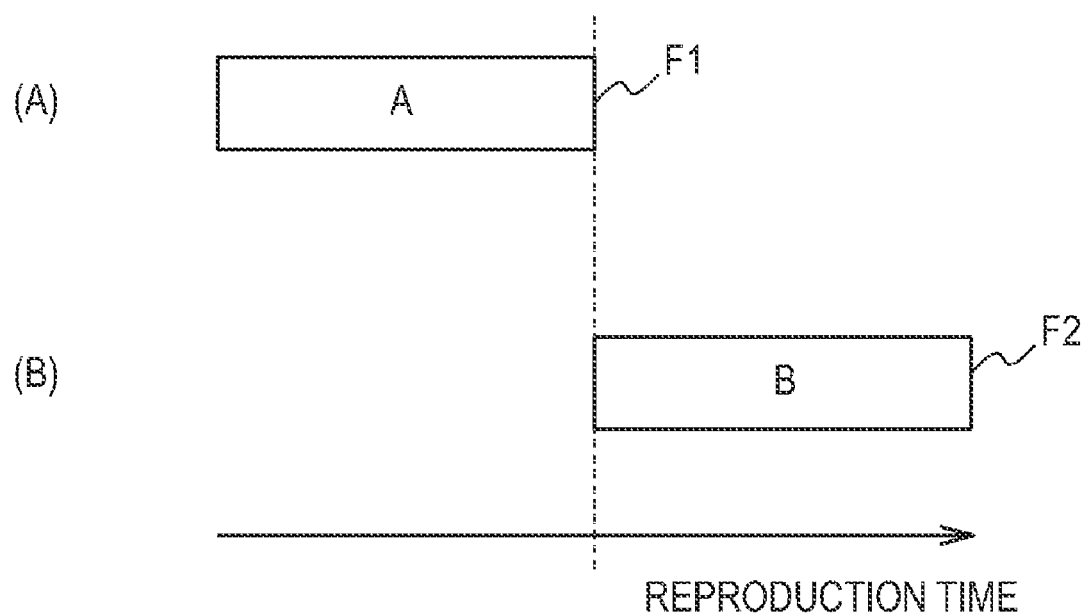
FIG. 27 is a schematic diagram serving for describing the editing processing using an example different from FIG. 26.
Figure 28:
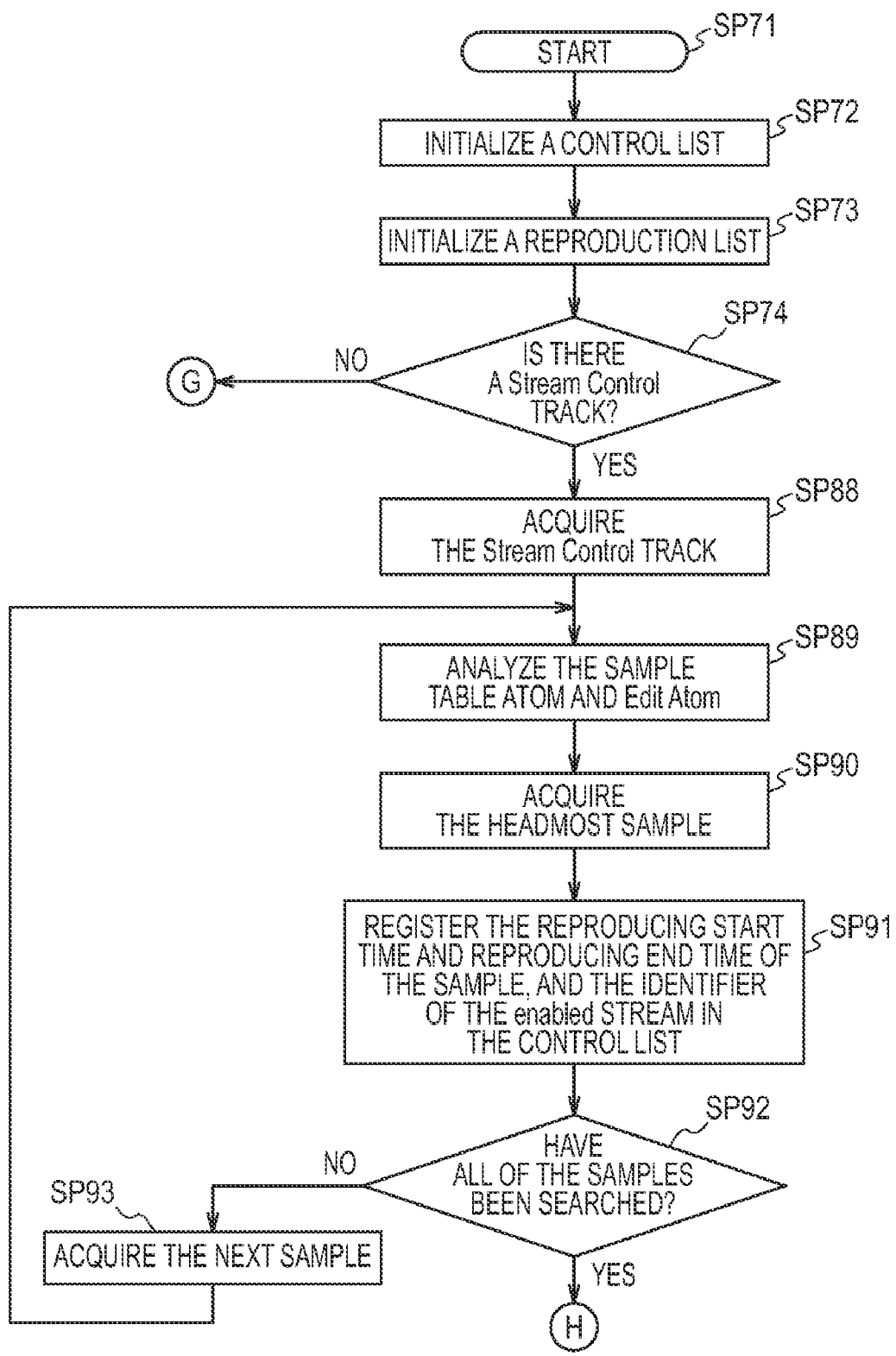
FIG. 28 is a flowchart illustrating the reproducing processing procedure of a QT file using a stream control track.
Figure 29:
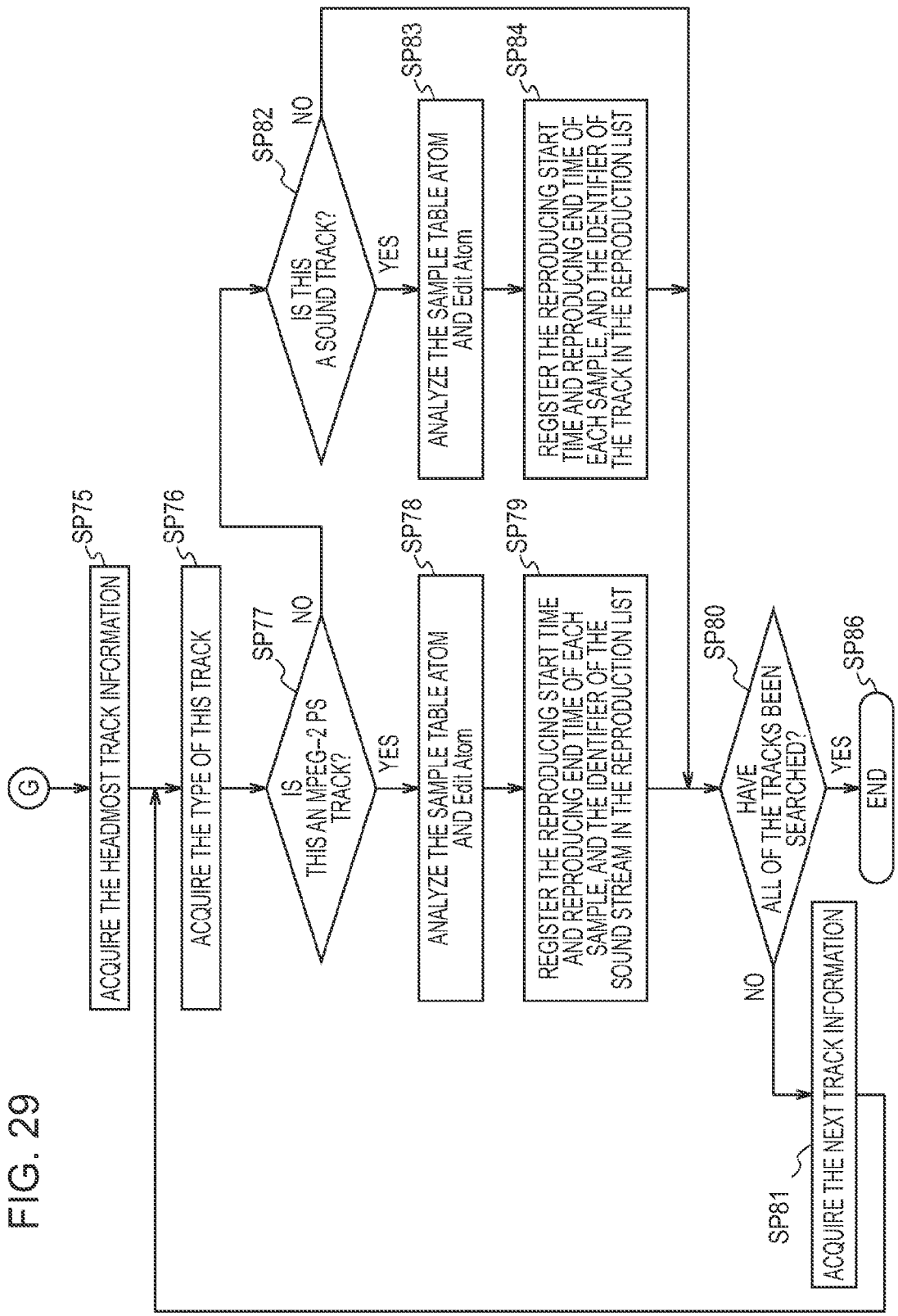
FIG. 29 is a flowchart illustrating a continuation of FIG. 28.
Figure 30:
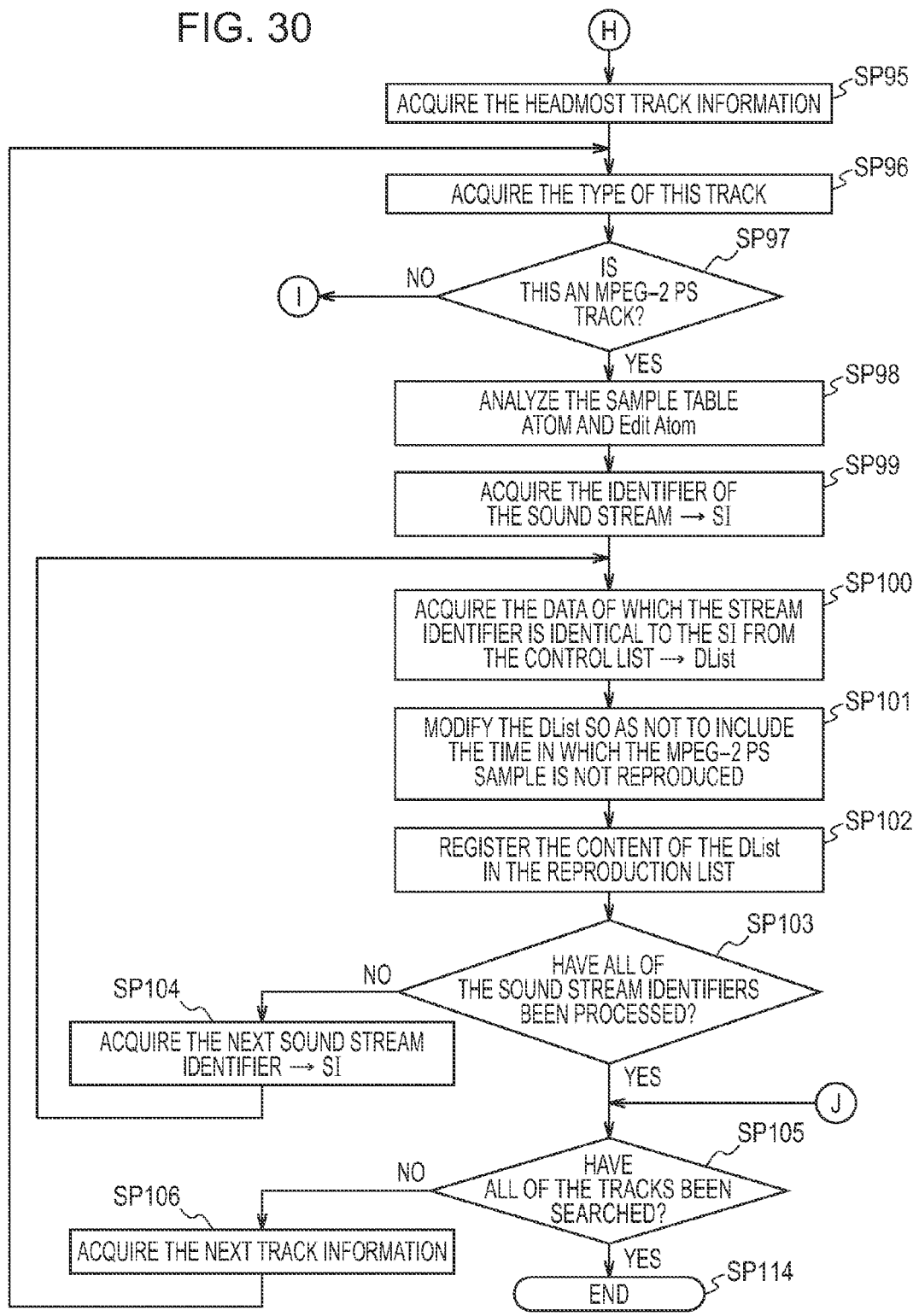
FIG. 30 is a flowchart illustrating a continuation of FIG. 28 according to a stream control track.
Figure 31:
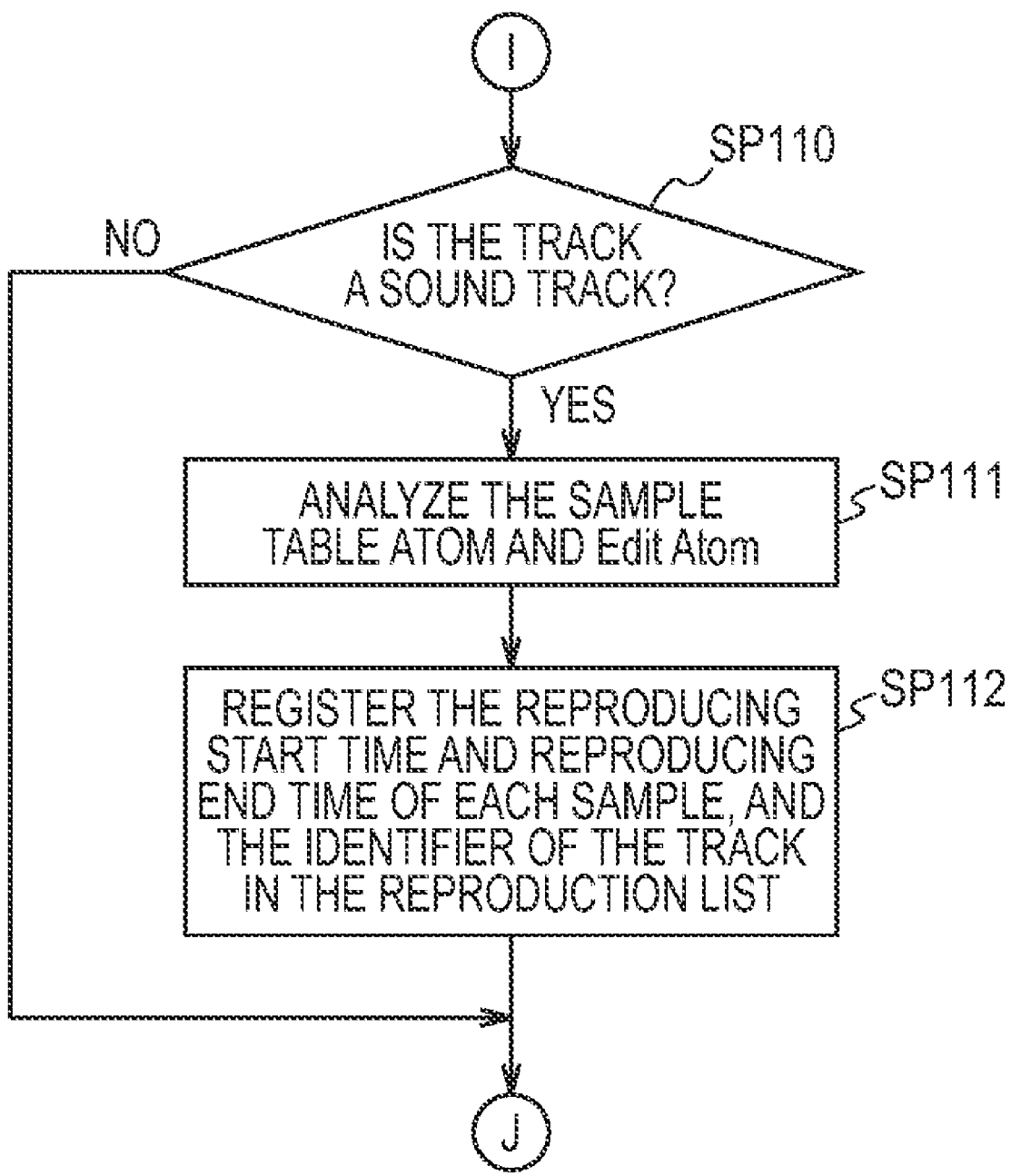
FIG. 31 is a flowchart illustrating a continuation of FIG. 30.

Also, as shown in FIG. 27, a QT file can be created wherein the media data atoms of the QT files F1 and F2 each made up of a program stream of the MPEG-2 are referenced, and based on the settings of the edit atoms thereof, the files F1 and F2 are sequentially reproduced.

With this embodiment, the present invention is applied to a reproducing device for reproducing a QT file subjected to such editing processing, and with this user interface, the amount of processing is reduced based on the identification information indicating GOP above described regarding FIG. 8, and the deviation between the reproduction time on the QT track and the actual reproduction time is corrected. Note that with this embodiment as well, description will be made with reference to the recording and reproducing system above described regarding FIG. 1.

That is to say, with this embodiment, the system control microcomputer 19, upon reproduction of this type of file being instructed by the user, acquires the information of the corresponding track atom regarding the program stream to be reproduced in accordance with the description of an editing list. Based on this information, the system control microcomputer 19 acquires the identification information indicating closed GOP set in a sample description atom.

In the event that it is confirmed by acquisition of this identification information that the entire scene B on the succeeding side is subjected to encoding processing with closed GOP at an interface portion between the scene A and scene B shown in FIG. 27 for example, the system control microcomputer 19 sequentially reproduces the scene A and scene B in accordance with the description of the edit atom, and provides this to the user. Thus, in the event that it is confirmed that the succeeding side is subjected to encoding processing with only closed GOP, the amount of processing can be reduced markedly.

On the other hand, in the event that the entire scene B on the succeeding side is not subjected to encoding processing with closed GOP, but at least the headmost GOP of this scene B is subjected to encoding processing with closed GOP, the system control microcomputer 19 starts reproduction from a reproducible position regarding the scene B. That is to say, in this case, in the event that the I picture of the headmost GOP of the scene B is included in the scene B, the system control microcomputer 19 starts reproduction of the scene B from this I picture, or in the event that the I picture of the headmost GOP of the scene B is not included in the scene B, the system control microcomputer 19 starts reproduction of the scene B from the subsequent I picture. Also, the reproduction end point-in-time of the scene A is extended further backwards than the point-in-time instructed by the edit atom by as much as the change in the reproduction start position of the scene B.

Thus, the timing for switching a stream so as to facilitate processing is changed, and also the deviation between the actual reproduction time and the reproduction time on the QT track due to this change is corrected.

Note that instead of such processing, an arrangement may be made wherein in the event that the entire scene B on the succeeding side is not subjected to encoding processing with closed GOP, and also the headmost GOP of the scene B is open GOP, the system control microcomputer 19 starts reproduction from a reproducible position regarding the scene B, and the reproduction end point-in-time of the scene A is extended further backwards than the point-in-time instructed by the edit atom. Thus, the timing for switching a stream so as to facilitate processing can be changed, and also the deviation between the actual reproduction time and the reproduction time on the QT track due to this change can be corrected.

Also, instead of this, an arrangement may be made wherein only in the event that the entire scene B on the succeeding side is subjected to encoding processing with closed GOP, the edited file is reproduced. Also, in the event that the top of the succeeding scene B is open GOP, the processing may be canceled in midstream. Note that in these cases, it becomes necessary to inform the user by user interface.

As with this embodiment, when reproducing the file subjected to editing processing so as to record the program stream using a QT file, the processing is switched based on the identification information indicating regarding whether to be closed GOP set in the sample description atom, whereby the processing according to reproduction of this type of file can be simplified. Also, according to such an arrangement, occurrence of an error in the middle of reproduction, and processing halt can be prevented, and consequently user annoyance due to occurrence of an error halting the processing can be reduced.

(9) Seventh Embodiment

With this embodiment, the present invention is applied to an editing device, processing is switched based on the identification information indicating regarding whether to be closed GOP set in a sample description atom when non-destructive editing using an edit atom. Note that with this embodiment as well, description will be made with reference to the configuration in FIG. 1.

That is to say, the system control microcomputer 19, in response to reproduction instructions by a user, selects an object to be edited, accepts the setting of an editing point to set an edit atom, sets a movie atom using this edit atom, and creates a file of editing results in an external reference format for referencing the track set in an original QT file.

This processing accepts the processing of editing only regarding the QT file subjected to encoding processing by closed GOP alone based on the identification information indicating regarding whether to be the closed GOP set in the sample description atom of a file to be edited. According to this arrangement, with this embodiment, the processing in the system is reduced, and editing processing can be performed with a simple configuration.

Thus, as for a file which accepts no editing processing, by informing the user that editing cannot be performed by user interface prior to starting editing, an error which occurs following the processing being started, halting of the processing, and so forth can be effectively prevented, the user annoyance due to these error, halting of the processing, and so forth can be reduced accordingly.

Note that instead of such processing, the editing processing can be performed by subjecting the portion made up of open GOP to re-encoding with closed GOP, and in this case, it is unnecessary to reproduce the program stream and determine regarding whether to be closed GOP, whereby the processing can be reduced.

As with this embodiment, when performing the editing processing so as to record the program stream using a QT file, the processing is switched based on the identification information indicating regarding whether to be closed GOP set in the sample description atom, whereby this editing processing can be simplified. Also, according to such an arrangement, occurrence of an error in the middle of reproduction, and processing halt can be prevented, and consequently user annoyance due to occurrence of an error halting the processing can be reduced.

(10) Eighth Embodiment

With this embodiment, the present invention is applied to an editing device, and a reproducing device of the file edited by this editing device, and the respective streams of a program stream are controlled in detail using a stream control track.

That is to say, with this embodiment, while reproducing the file specified by a user, the editing device accepts the settings of reproduction output, and halt of reproduction output instructed by the user regarding the sound streams provided in this file, as shown in FIG. 12. The editing device creates a editing list based on this settings, acquires information regarding the sound stream assigned to a program stream to be edited from this editing list, and thus creates a stream control track. Also, as for the remaining sound streams, the editing device sets the duration of reproduction output and the duration for stopping reproduction output based on the edit atom and sample table atom of the corresponding track atom.

The editing device sets the stream control track thus created to actual data serving as a track, and as for actual data serving as another sound track and actual data serving as the program stream, the editing device creates a file of editing results by creating a resource using a format for referencing the original file.

According to this arrangement, with this embodiment, the multiple sound streams are arranged so as to be controlled in detail, and accordingly to improve usability according to this type of file.

Also, this stream control track is assigned to a media data atom to be provided as a track, whereby further editing processing can be executed with reference to the stream control track according to editing results thus created. Moreover, in this case, modifying the stream control track which is a so-called original enables the modification to be reflected on another editing result obtained by thus referencing thereto, whereby efficiency of the processing, and simplification of maintenance can be realized accordingly.

FIG. 28 through FIG. 31 are flowcharts illustrating the processing procedure according to a reproducing device for reproducing a QT file in which a stream control track is thus provided. With this reproducing device, the recording and reproducing system is configured generally in the same way as the videodisc device 1 above described regarding FIG. 1 except that the configuration relating to this stream control track differs, so description will be made with reference to the configuration in FIG. 1.

With this reproducing device, upon reproduction of a file being instructed by a user, the system control microcomputer 19 starts this processing procedure, proceeds to step SP72 from step SP71, and here initializes a control list. Here, the control list is a list for controlling the sound streams serving as a program stream assigned to this file. Also, the system control microcomputer 19 initializes an object-to-be-reproduced list in the subsequent step SP73. Here, the object-to-be-reproduced list is a list for identifying objects to be reproduced regarding the tracks assigned to this file.

Subsequently, the system control microcomputer 19 proceeds to step SP74, and here determines whether or not there is a stream control track by reproducing the movie atom. Upon a negative result being obtained here, the system control microcomputer 19 proceeds to step SP75 from step SP74, and acquires the information of the headmost track atom from the information of the movie atom.

The system control microcomputer 19, in the subsequent step SP76, detects the type of the track corresponding to the information of this acquired track atom, and in the subsequent step SP77, determines whether or not this track is a program stream of the MPEG-2. Upon a positive result being obtained here, the system control microcomputer 19 proceeds to step SP78 from step SP77, analyzes the edit atom and sample table atom of this track atom, and in the subsequent step SP79, registers reproduction start time, reproduction end time, and the identifier of the sound stream regarding each sample set by the sample table atom into the object-to-be-reproduced list based on this analysis results.

Subsequently, the system control microcomputer 19 proceeds to step SP80, determines whether or not the processing regarding all of the track atoms has been completed, and upon a negative result being obtained here, the system control microcomputer 19 proceeds to step SP81 from step SP80, switches an object to be processed to the next track atom, and then returns to step SP76.

On the other hand, upon a negative result being obtained in step SP77, the system control microcomputer 19 proceeds to step SP82 from step SP77, determines whether or not the corresponding track is a sound track, and upon a negative result being obtained here, the system control microcomputer 19 proceeds to step SP80. On the other hand, upon a positive result being obtained in step SP82, the system control microcomputer 19 proceeds to step SP83 from step SP82, analyzes the edit atom and sample table atom of this track atom, and in the subsequent step SP84, registers reproduction start time, reproduction end time, and the identifier of the corresponding track regarding each sample set by the sample table atom into the object-to-be-reproduced list based on this analysis results, and the flow proceeds to step SP80.

Also, upon the processing regarding all of the track atoms been completed, the system control microcomputer 19 can obtain a positive result in step SP80, and accordingly proceeds to step SP86 from step SP80, and ends this processing procedure.

According to this arrangement, in the event that no stream control track is provided, the system control microcomputer 19 is arranged so as to generate an object-to-be-reproduced list for instructing start of reproduction and end of reproduction regarding each sound track, sound stream based on the edit atom set to each track.

On the other hand, upon a positive result being obtained in step SP74, the system control microcomputer 19 proceeds to step SP88 from step SP74, and acquires the track atom information according to this stream control track. Also, in the subsequent step SP89, the system control microcomputer 19 acquires and analyzes the information of the sample table atom and edit atom of this track atom, and in the subsequent step SP90, reproduces the headmost sample from the detected stream control track based on this analysis result. The system control microcomputer 19, in the subsequent step SP91, registers the reproduction start time, reproduction end time, and the identifier of the sound stream which is set enable into the control list based on this headmost sample information, and in the subsequent step SP92, determines whether or not the processing up to the tail end sample of the stream control track has been completed.

Upon a negative result being obtained here, the system control microcomputer 19 proceeds to step SP93 from step SP92, sets an object to be processed to the next sample, and then returns to step SP89. According to this arrangement, the system control microcomputer 19 is arranged so as to sequentially acquire the information registered in the stream control track by the samples, and register this into the control list.

Upon the processing regarding all of the samples having been completed, the system control microcomputer 19 can obtain a positive result in step SP 92, and accordingly proceeds to step SP95 from step SP92. Here, the system control microcomputer 19 acquires the information of the headmost track atom from the information of the movie atom.

The system control microcomputer 19, in the subsequent step SP96, detects the type of the track corresponding to the information of this acquired track atom, and in the subsequent step SP97, determines whether or not this track is a program stream of the MPEG-2. Upon a positive result being obtained here, the system control microcomputer 19 proceeds to step SP98 from step SP97, analyzes the edit atom and sample table atom of this track atom, and in the subsequent step SP99, acquires the identifier of the sound stream based on this analysis results.

The system control microcomputer 19, in the subsequent step SP100, acquires the information according to the corresponding stream recorded in the control list based on this identifier, and registers this information into a tentative list (DList) in the format corresponding to the object-to-be-reproduced list. Also, in the subsequent step SP101, the system control microcomputer 19 corrects the description of the stream control track with the description of the edit atom by performing correction so as not to reproduce any sound stream in the tentative list regarding the duration in which reproduction of the program stream is stopped by the edit atom, and in the subsequent step SP102, registers the record of the tentative list thus corrected into the object-to-be-controlled list.

Also, in the subsequent step SP103, the system control microcomputer 19 determines whether or not the processing regarding all of the sound streams has been completed, and upon a negative result being obtained here, the system control microcomputer 19 proceeds to step SP104 from step SP103, switches an object to be processed to the next sound stream, and then returns to step SP100.

On the other hand, upon the processing regarding all of the sound streams having been completed, the system control microcomputer 19 can obtain a positive result in step SP103, and accordingly proceeds to step SP105 from step SP103, and here determines whether or not all of the tracks have been processed. Upon a negative result being obtained here, the system control microcomputer 19 proceeds to step SP106 from step SP105, switches an object to be processed to the subsequent track, and then returns to step SP96.

On the other hand, upon a negative result being obtained in step SP97, the system control microcomputer 19 proceeds to step SP110 from step SP97, here determines whether or not the track according to this track atom is a sound track, and upon a positive result being obtained here, the system control microcomputer 19 analyzes the sample table atom and edit atom, and in the subsequent step SP112, records reproduction start time and so forth in the object-to-be-reproduced list based on this analysis results, following which proceeds to step SP105. On the other hand, upon a negative result being obtained in step SP110, the system control microcomputer 19 directly proceeds to step SP105 from step SP110.

According to the above arrangement, upon the processing regarding all of the tracks having been completed following the object-to-be-reproduced list having been set sequentially, the system control microcomputer 19 can obtain a positive result in step SP105, and thus proceeds to step SP114 from step SP105, and ends this processing procedure.

When thus creating the object-to-be-edited list, the system control microcomputer 19 controls the entire operation so as to reproduce the sound tracks and sound streams set in the object-to-be-edited list, also controls the output or non-output of the sound serving as this reproduction result by controlling operation of the audio decoder 14 in accordance with the record of the object-to-be-edited list, and thus controls reproduction according to the sound streams in accordance with the settings of the stream control track.

According to this embodiment, the program stream is arranged so as to be recorded using a QT file, and a track for controlling reproduction of the program stream is formed of the same track as the actual data according to this program stream, whereby the multiple tracks making up the program stream can be controlled in detail, and usability can be improved accordingly.

(11) Ninth Embodiment

This embodiment reproduces a QT file in a combination of the stream control track above described regarding the Eighth Embodiment and mixing based on priorities above described regarding the Third Embodiment.

With this embodiment, a QT file is arranged so as to be reproduced in combination of the above stream control track and mixing based on priorities, whereby reproduction of the QT file can be controlled further in detail.

(12) Other Embodiments

Note that with the above embodiments, the case has been described wherein output or non-output of reproduction results is simply controlled with a stream control track, but the present invention is not restricted to this case, and can be widely applied to various types of control such as a case in which the ratio according to mixing is defined to perform control with this ratio, for example.

Also, with the above embodiments, the case has been described wherein a program stream of the MPEG-2 is processed, but the present invention is not restricted to this case, and can be widely applied to the processing of a stream which is made up of multiplexing the elementary streams of video and sound, such as a transport stream conforming to the MPEG-2, and a program stream in various types of format.

Also, with the above embodiments, the case has been described wherein the present invention is applied to a videodisc device and the like using a QT file, but the present invention is not restricted to this case, and can be widely applied to a recording device, reproducing device, and so forth of a file having the same configuration as a QT file, such as an ISO Base Media file format on the basis of a QT format (MPEG4-part12), Motion JPEG2000 (MJ2) file format, and AVC (Advanced Video Coding: MPEG4-part10) file format, for example.

Also, with the above embodiments, the case has been described wherein a QT file is recorded in an optical disc, but the present invention is not restricted to this case, and can be widely applied to the cases in which a QT file is recorded in various types of recording medium, such as a magnetic disk, or memory card.

INDUSTRIAL APPLICABILITY

The present invention can be applied to a videodisc device, for example.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A file recording device comprising:
at least one processor;
at least one recording device; and
at least one memory device configured to store: (i) a file of a predetermined format, and (ii) a plurality of instructions, which when executed by the at least one processor, cause the at least one processor to operate with the at least one recording device to:
(a) manage an actual data block of the file, the actual data block including:
 (i) at least one video stream including video data,
 (ii) at least one audio stream including audio data,
 (iii) at least one program stream including the at least one video stream and the at least one audio stream multiplexed together, and
 (iv) a control section configured to store control information to control each respective stream multiplexed in the at least one program stream, wherein the control information is associated with either output or non-output of reproduction regarding each said stream multiplexed in the at least one program stream,
(b) manage a management information block of the file, the management information block including management information arranged in a hierarchical structure based on the control information, the management information including:
 (i) a video stream reproducing section configured to store information to reproduce the at least one video stream,
 (ii) an audio stream reproducing section configured to store information to reproduce the at least one audio stream,
 (iii) a program stream reproducing section configured to store information to reproduce the at least one program stream,
 (iv) a non-destructive editing section configured to store information to enable non-destructive editing of the at least one program stream, and
 (v) a priority section configured to store priority information indicating a priority of the at least one video stream and the at least one audio stream multiplexed in the at least one program stream, and
(c) record the at least one program stream to the at least one memory device based on the priority information, wherein the at least one video stream is reproducible from the file independent of the at least one program stream, and wherein the at least one audio stream is reproducible from the file independent of the at least one program stream.

2. The file recording device of claim 1, wherein the management information block includes extended data associated with the video stream reproducing section, the audio stream reproducing section and the program stream reproducing section.

3. The file recording device of claim 2, wherein the program stream reproducing section includes a system information entry relating to basic information and a system auxiliary information entry relating to auxiliary information.

4. The file recording device of claim 1, wherein the program stream reproducing section includes identification information which indicates whether said video data multiplexed into the at least one program stream has been subjected to encoding processing with: (i) closed group of pictures, or (ii) open group of pictures.

5. The file recording device of claim 1, wherein, for each of a plurality of actual data blocks, the priority information indicates the priority of the at least one video stream and the at least one audio stream multiplexed in the at least one program stream corresponding to said actual data block at the time of reproducing or recording said at least one program stream.

6. A file reproducing device comprising:
at least one processor;
at least one reproducing device; and
at least one memory device configured to store: (i) a file of a predetermined format, and (ii) a plurality of instructions, which when executed by the at least one processor, cause the at least one processor to operate with the at least one reproducing device to:
(a) manage an actual data block of the file, the actual data block including:
 (i) at least one video stream including video data,
 (ii) at least one audio stream including audio data,
 (iii) at least one program stream including the at least one video stream and the at least one audio stream multiplexed together, and
 (iv) a control section configured to store control information to control each respective stream multiplexed in the at least one program stream, wherein the control information is associated with either output or non-output of reproduction regarding each said stream multiplexed in the at least one program stream,
(b) manage a management information block of the file, the management information block including management information arranged in a hierarchical structure based on the control information, the management information including:
 (i) a video stream reproducing section configured to store information to reproduce the at least one video stream,
 (ii) an audio stream reproducing section configured to store information to reproduce the at least one audio stream,
 (iii) a program stream reproducing section configured to store information to reproduce the at least one program stream,
 (iv) a non-destructive editing section configured to store information to enable non-destructive editing of the at least one program stream, and
 (v) a priority section configured to store priority information indicating a priority of the at least one video stream and the at least one audio stream multiplexed in the at least one program stream, and
(c) reproduce the at least one program stream from the file of the predetermined format based on the priority information, wherein the at least one video stream is reproducible from the file independent of the at least one program stream, and wherein the at least one audio stream is reproducible from the file independent of the at least one program stream.

7. The file reproducing device of claim 6, wherein when executed by the at least one processor, the plurality of instructions cause the at least one processor to operate with the at least one recording device to determine whether the file will be difficult to reproduce based on the information to reproduce the at least one program stream stored in the program stream reproducing section.

8. The file reproducing device of claim 7, wherein the determination whether the file will be difficult to reproduce is based on identification information stored by the program stream reproducing section, the identification information indicating whether said video data multiplexed into the at least one program stream has been subjected to encoding processing with: (i) closed group of pictures, or (ii) open group of pictures.

9. The file reproducing device of claim 6, wherein the program stream reproducing section includes identification information which indicates whether said video data multiplexed into the at least one program stream has been subjected to encoding processing with: (i) closed group of pictures, or (ii) open group of pictures.

10. The file reproducing device of claim 6, wherein, for each of a plurality of actual data blocks, the priority information indicates the priority of the at least one video stream and the at least one audio stream multiplexed in the at least one program stream corresponding to said actual data block at the time of reproducing or recording said at least one program stream.

11. A file editing device comprising:
at least one processor;
at least one reproducing device; and
at least one memory device configured to store: (i) a file of a predetermined format, and (ii) a plurality of instructions, which when executed by the at least one processor, cause the at least one processor to operate with the at least one reproducing device to:
(a) manage an actual data block of the file, the actual data block including:
(i) at least one video stream including video data,
(ii) at least one audio stream including audio data,
(iii) at least one program stream including the at least one video stream and the at least one audio stream multiplexed together, and
(iv) a control section configured to store control information to control each respective stream multiplexed in the at least one program stream, wherein the control information is associated with either output or non-output of reproduction regarding each said stream multiplexed in the at least one program stream,
(b) manage a management information block of the file, the management information block including management information arranged in a hierarchical structure based on the control information, the management information including:
(i) a video stream reproducing section configured to store information to reproduce the at least one video stream,
(ii) an audio stream reproducing section configured to store information to reproduce the at least one audio stream,
(iii) a program stream reproducing section configured to store information to reproduce the at least one program stream,
(iv) a non-destructive editing section configured to store editing information to enable non-destructive editing of the at least one program stream, and
(v) a priority section configured to store priority information indicating a priority of the at least one video stream and the at least one audio stream multiplexed in the at least one program stream,
(c) determine whether to edit the at least one program stream based on the editing information, and
(d) if the determination is to edit the at least one program stream:

(i) reproduce the at least one program stream from the file, wherein the at least one video stream is reproducible from the file independent of the at least one program stream, and wherein the at least one audio stream is reproducible from the file independent of the at least one program stream, and
(ii) edit the reproduced program stream.

12. The file editing device of claim 11, wherein the determination whether to edit the at least one program stream is based on the editing information and the information to reproduce the at least one program stream stored by the program stream reproducing section.

13. The file reproducing device of claim 11, wherein the program stream reproducing section includes identification information which indicates whether said video data multiplexed into the at least one program stream has been subjected to encoding processing with: (i) closed group of pictures, or (ii) open group of pictures.

14. The file editing device of claim 11, wherein the determination whether to edit the at least one program stream is based on identification information stored by the program stream reproducing section, the identification information indicating whether said video data multiplexed into the at least one program stream has been subjected to encoding processing with: (i) closed group of pictures, or (ii) open group of pictures.

15. A file recording method comprising:
(a) managing an actual data block of a file of a predetermined format, the actual data block including:
(i) at least one video stream including video data,
(ii) at least one audio stream including audio data,
(iii) at least one program stream including the at least one video stream and the at least one audio stream multiplexed together, and
(iv) control information to control each respective stream multiplexed in the at least one program stream, wherein the control information is associated with either output or non-output of reproduction regarding each said stream multiplexed in the at least one program stream,
(b) managing a management information block of the file, the management information block including management information arranged in a hierarchical structure based on the control information, the management information including:
(i) a video stream reproducing section configured to store information to reproduce the at least one video stream,
(ii) an audio stream reproducing section configured to store information to reproduce the at least one audio stream,
(iii) a program stream reproducing section configured to store information to reproduce the at least one program stream,
(iv) a non-destructive editing section configured to store information to enable non-destructive editing of the at least one program stream, and
(v) a priority section configured to store priority information indicating a priority of the at least one video stream and the at least one audio stream multiplexed in the at least one program stream, and
(c) recording the at least one program stream to at least one memory device based on the priority information, wherein the at least one video stream is reproducible from the file independent of the at least one program stream, and wherein the at least one audio stream is reproducible from the file independent of the at least one program stream.

16. The file recording method of claim 15, which includes associating identification information with the program stream reproducing section, the identification information indicating whether said video data multiplexed into the at least one program stream has been subjected to encoding processing with: (i) closed group of pictures, or (ii) open group of pictures.

17. A file reproducing method comprising:
(a) managing an actual data block of a file of a predetermined format, the actual data block including:
 (i) at least one video stream including video data,
 (ii) at least one audio stream including audio data,
 (iii) at least one program stream including the at least one video stream and the at least one audio stream multiplexed together, and
 (iv) control information to control each respective stream multiplexed in the at least one program stream, wherein the control information is associated with either output or non-output of reproduction regarding each said stream multiplexed in the at least one program stream,
(b) managing a management information block of the file, the management information block including management information arranged in a hierarchical structure based on the control information, the management information including:
 (i) a video stream reproducing section configured to store information to reproduce the at least one video stream,
 (ii) an audio stream reproducing section configured to store information to reproduce the at least one audio stream,
 (iii) a program stream reproducing section configured to store information to reproduce the at least one program stream,
 (iv) a non-destructive editing section configured to store information to enable non-destructive editing of the at least one program stream, and
 (v) a priority section configured to store priority information indicating a priority of the at least one video stream and the at least one audio stream multiplexed in the at least one program stream, and
(c) reproducing the at least one program stream from the file of the predetermined format based on the priority information, wherein the at least one video stream is reproducible from the file independent of the at least one program stream, and wherein the at least one audio stream is reproducible from the file independent of the at least one program stream.

18. The file reproducing method of claim 17, which includes associating identification information with the program stream reproducing section, the identification information indicating whether said video data multiplexed into the at least one program stream has been subjected to encoding processing with: (i) closed group of pictures, or (ii) open group of pictures.

19. A file editing method comprising:
(a) managing an actual data block of a file of a predetermined format, the actual data block including:
 (i) at least one video stream including video data,
 (ii) at least one audio stream including audio data,
 (iii) at least one program stream including the at least one video stream and the at least one audio stream multiplexed together, and
 (iv) control information to control each respective stream multiplexed in the at least one program stream, wherein the control information is associated with either output or non-output of reproduction regarding each said stream multiplexed in the at least one program stream,
(b) managing a management information block of the file, the management information block including management information arranged in a hierarchical structure based on the control information, the management information including:
 (i) a video stream reproducing section configured to store information to reproduce the at least one video stream,
 (ii) an audio stream reproducing section configured to store information to reproduce the at least one audio stream,
 (iii) a program stream reproducing section configured to store information to reproduce the at least one program stream,
 (iv) a non-destructive editing section configured to store editing information to enable non-destructive editing of the at least one program stream, and
 (v) a priority section configured to store priority information indicating a priority of the at least one video stream and the at least one audio stream multiplexed in the at least one program stream,
(c) determining whether to edit the at least one program stream based on the editing information, and
(d) if the determination is to edit the at least one program stream:
 (i) reproducing the at least one program stream from the file, wherein the at least one video stream is reproducible from the file independent of the at least one program stream, and wherein the at least one audio stream is reproducible from the file independent of the at least one program stream, and
 (ii) editing the reproduced program stream.

20. The file editing method of claim 19, which includes associating identification information with the program stream reproducing section, the identification information indicating whether said video data multiplexed into the at least one program stream has been subjected to encoding processing with: (i) closed group of pictures, or (ii) open group of pictures.

21. A record medium comprising:
a plurality of instructions, which when executed by at least one processor, cause the at least one processor to operate with at least one recording device by:
(a) managing an actual data block of a file of a predetermined format, the actual data block including:
 (i) at least one video stream including video data,
 (ii) at least one audio stream including audio data,
 (iii) at least one program stream including the at least one video stream and the at least one audio stream multiplexed together, and
 (iv) a control section configured to store control information to control each respective stream multiplexed in the at least one program stream, wherein the control information is associated with either output or non-output of reproduction regarding each said stream multiplexed in the at least one program stream,
(b) managing a management information block of the file, the management information block including management information arranged in a hierarchical structure based on the control information, the management information including:

(i) a video stream reproducing section configured to store information to reproduce the at least one video stream, (ii) an audio stream reproducing section configured to store information to reproduce the at least one audio stream, (iii) a program stream reproducing section configured to store information to reproduce the at least one program stream, (iv) a non-destructive editing section configured to store information to enable non-destructive editing of the at least one program stream, and (v) a priority section configured to store priority information indicating a priority of the at least one video stream and the at least one audio stream multiplexed in the at least one program stream, and (c) recording the at least one program stream as the file of the predetermined format based on the priority information, wherein the at least one video stream is reproducible from the file independent of the at least one program stream, and wherein the at least one audio stream is reproducible from the file independent of the at least one program stream.

22. A record comprising:

a plurality of instructions, which when executed by at least one processor, cause the at least one processor to operate with at least one reproducing device by:

(a) managing an actual data block a file of a predetermined format, the actual data block including:

(i) at least one video stream including video data, (ii) at least one audio stream including audio data, (iii) at least one program stream including the at least one video stream and the at least one audio stream multiplexed together, and (iv) a control section configured to store control information to control each respective stream multiplexed in the at least one program stream, wherein the control information is associated with either output or non-output of reproduction regarding each said stream multiplexed in the at least one program stream, (b) managing a management information block of the file, the management information block including management information arranged in a hierarchical structure based on the control information, the management information including:

(i) a video stream reproducing section configured to store information to reproduce the at least one video stream, (ii) an audio stream reproducing section configured to store information to reproduce the at least one audio stream, (iii) a program stream reproducing section configured to store information to reproduce the at least one program stream, (iv) a non-destructive editing section configured to store information to enable non-destructive editing of the at least one program stream, and (v) a priority section configured to store priority information indicating a priority of the at least one video stream and the at least one audio stream multiplexed in the at least one program stream, and (c) reproducing the at least one program stream from the file of the predetermined format based on the priority information, wherein the at least one video stream is reproducible from the file independent of the at least one program stream, and wherein the at least one audio stream is reproducible from the file independent of the at least one program stream.

23. A record comprising:

a plurality of instructions, which when executed by at least one processor, cause the at least one processor to operate with at least one reproducing device by:

(a) manage an actual data block of a file of a predetermined format, the actual data block including:

(i) at least one video stream including video data, (ii) at least one audio stream including audio data, (iii) at least one program stream including the at least one video stream and the at least one audio stream multiplexed together, and (iv) a control section configured to store control information to control each respective stream multiplexed in the at least one program stream, wherein the control information is associated with either output or non-output of reproduction regarding each said stream multiplexed in the at least one program stream, (b) manage a management information block of the file, the management information block including management information arranged in a hierarchical structure based on the control information, the management information including:

(i) a video stream reproducing section configured to store information to reproduce the at least one video stream, (ii) an audio stream reproducing section configured to store information to reproduce the at least one audio stream, (iii) a program stream reproducing section configured to store information to reproduce the at least one program stream, (iv) a non-destructive editing section configured to store editing information to enable non-destructive editing of the at least one program stream, and (v) a priority section configured to store priority information indicating a priority of the at least one video stream and the at least one audio stream multiplexed in the at least one program stream, (c) determine whether to edit the at least one program stream based on the editing information, and (d) if the determination is to edit the at least one program stream:

(i) reproduce the at least one program stream from the file, wherein the at least one video stream is reproducible from the file independent of the at least one program stream, and wherein the at least one audio stream is reproducible from the file independent of the at least one program stream, and (ii) edit the reproduced program stream.

24. A recording medium having a file with a predetermined format recorded thereon, the recording medium comprising:

a plurality of instructions, which when executed by at least one processor, cause the at least one processor to operate with at least one recording device by:

(a) managing an actual data block of the file, the actual data block including:

(i) at least one video stream including video data, (ii) at least one audio stream including audio data, (iii) at least one program stream including the at least one video stream and the at least one audio stream multiplexed together, and (iv) a control section configured to store control information to control each respective stream multiplexed in the at least one program stream, wherein the control information is associated with either output or non-output of reproduction regarding each said stream multiplexed in the at least one program stream, (b) managing a management information block of the file, the management information block including management information arranged in a hierarchical structure based on the control information, the management information including:

(i) a video stream reproducing section configured to store information to reproduce the at least one video stream, (ii) an audio stream reproducing section configured to store information to reproduce the at least one audio stream, (iii) a program stream reproducing section configured to store information to reproduce the at least one program stream, (iv) a non-destructive editing section configured to store information to enable non-destructive editing of the at least one program stream, and (v) a priority section configured to store priority information indicating a priority of the at least one video stream and the at least one audio stream multiplexed in the at least one program stream, and (c) recording the at least one program stream to the file of the predetermined format based on the priority information, wherein the at least one video stream is reproducible from the file independent of the at least one program stream, and wherein the at least one audio stream is reproducible from the file independent of the at least one program stream.

* * * * *